(12) United States Patent (10) Patent No.: US 11,321,890 B2
Paradiso et al. (45) Date of Patent: May 3, 2022

(54) USER INTERFACE FOR GENERATING EXPRESSIVE CONTENT

(71) Applicant: Microsoft Technology Licensing, LLC, Redmond, WA (US)

(72) Inventors: Ann M. Paradiso, Shoreline, WA (US); Jonathan Campbell, Redmond, WA (US); Edward Bryan Cutrell, Seattle, WA (US); Harish Kulkarni, Redmond, WA (US); Meredith Morris, Bellevue, WA (US); Alexander John Fiannaca, Seattle, WA (US); Kiley Rebecca Sobel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/347,653

(22) Filed: Nov. 9, 2016

(65) Prior Publication Data

US 2018/0130459 A1 May 10, 2018

(51) Int. Cl.
*G10L 13/04* (2013.01)
*G06T 13/00* (2011.01)
(Continued)

(52) U.S. Cl.
CPC ............ *G06T 13/00* (2013.01); *G06F 3/0236* (2013.01); *G06F 3/0237* (2013.01);
(Continued)

(58) Field of Classification Search
CPC ..... G06T 13/00; G06F 40/274; G06F 3/0236; G06F 3/0237; G06F 3/04817; G06F 3/04886; G10L 13/04
(Continued)

(56) References Cited

U.S. PATENT DOCUMENTS 7,908,554 B1 * 3/2011 Blattner ............... G06Q 10/107
715/706
7,966,185 B2 6/2011 Eide
(Continued)

OTHER PUBLICATIONS

"ExpressivePower", http://web.archive.org/web/20131202195149/ http:/www.assistiveware.com/innovation/expressivepower, Published on: Dec. 2, 2013, 2 pages.
(Continued)

*Primary Examiner* — Jesse S Pullias

(57) ABSTRACT

Generation of expressive content is provided. An expressive synthesized speech system provides improved voice authoring user interfaces by which a user is enabled to efficiently author content for generating expressive output. An expressive synthesized speech system provides an expressive keyboard for enabling input of textual content and for selecting expressive operators, such as emoji objects or punctuation objects for applying predetermined prosody attributes or visual effects to the textual content. A voicesetting editor mode enables the user to author and adjust particular prosody attributes associated with the content for composing carefully-crafted synthetic speech. An active listening mode (ALM) is provided, which when selected, a set of ALM effect options are displayed, wherein each option is associated with a particular sound effect and/or visual effect. The user is enabled to rapidly respond with expressive vocal sound effects or visual effects while listening to others speak.

19 Claims, 27 Drawing Sheets

(51) Int. Cl.
G06F 3/04817 (2022.01)
G06F 3/04886 (2022.01)
G06F 3/023 (2006.01)
G06F 40/274 (2020.01)

(52) U.S. Cl.
CPC ...... *G06F 3/04817* (2013.01); *G06F 3/04886* (2013.01); *G06F 40/274* (2020.01); *G10L 13/04* (2013.01)

(58) Field of Classification Search
USPC .................................................. 704/257–275
See application file for complete search history.

(56) References Cited

U.S. PATENT DOCUMENTS

| | | | |
|---|---|---|---|
| 8,886,537 | B2 | 11/2014 | Goldberg et al. |
| 2006/0257827 | A1 | 11/2006 | Ellenson |
| 2010/0123724 | A1* | 5/2010 | Moore ................ G06F 3/04817 345/473 |
| 2010/0141662 | A1 | 6/2010 | Storey et al. |
| 2010/0332224 | A1* | 12/2010 | Makela ................ G09B 21/007 704/231 |
| 2011/0040155 | A1* | 2/2011 | Guzak ...................... A61B 5/16 600/300 |
| 2011/0202347 | A1* | 8/2011 | Moore .................. H04M 7/003 704/260 |
| 2012/0130717 | A1* | 5/2012 | Xu .......................... G06T 13/40 704/258 |
| 2013/0247078 | A1* | 9/2013 | Nikankin ......... H04N 21/44204 725/13 |
| 2013/0332167 | A1* | 12/2013 | Kilgore ............... H04M 3/4938 704/251 |
| 2014/0067397 | A1* | 3/2014 | Radebaugh ............ G10L 13/08 704/260 |
| 2015/0046164 | A1 | 2/2015 | Maganti |
| 2015/0100537 | A1* | 4/2015 | Grieves .................. G06N 5/048 706/52 |
| 2016/0078859 | A1 | 3/2016 | Luan et al. |
| 2017/0083506 | A1* | 3/2017 | Liu ....................... G06F 17/279 |

OTHER PUBLICATIONS

O'Brien, et al. "The Interpretation and Use of Emoji emoticons (Emojis) in Augmentative and Alternative Communication (AAC)", In Proceedings of the 27th International Symposium on Algorithms and Computation, Aug. 6, 2016, 5 pages.

Brady, Lois, "InnerVoice Communication App", https://proactivespeech.wordpress.com/2013/11/18/innervoice-communication-app/. Published on: Nov. 18, 2013, 5 pages.

Tzvi, "7 Assistive Communication Apps in the iPad App Store", http://www.friendshipcircle.org/blog/2011/02/07/7-assistive-communication-apps-in-the-ipad-app-store/, Published on: Feb. 7, 2011, 10 pages.

"UrVoice AAC—Text to speech—Augmentative and alternative communication with type and talk capabilities", https://itunes.apple.com/us/app/urvoice-aac-text-to-speech/id850150951?mt=8, Published on: Oct. 6, 2014, 2 pages.

"Emojis Say Volumes Without a Word ;)", http://learningenglish.voanews.com/a/emoji-say-volumes-without-a-word-/3004375.html, Published on: Oct. 14, 2015, 5 pages.

Aylett, et al., "Don't Say Yes, Say Yes: Interacting with Synthetic Speech Using Tonetable", In Proceedings of the CHI Conference Extended Abstracts on Human Factors in Computing Systems, May 7, 2016, pp. 3643-3646.

Burnett, et al., "Speech Synthesis Markup Language (SSML) Version 1.0", https://www.w3.org/TR/speech-synthesis/, Published on: Sep. 7, 2004, 23 pages.

Campbell, Nick, "Approaches to Conversational Speech Rhythm: Speech Activity in Two-Person Telephone Dialoges", In Proceedings of the 16th International Congress of the Phonetic Sciences, Aug. 6, 2007, pp. 343-348.

"CereVoice Engine Text-to-Speech SDK", https://www.cereproc.com/en/products/sdk, Retrieved on: Oct. 4, 2016, 3 pages.

Charfuelan, et al., "Expressive Speech Synthesis in MARY TTS Using Audiobook Data and EmotionML", In Proceedings of 14th Annual Conference of the International Speech Communication Association, Aug. 25, 2013, 5 pages.

Ekman, et al., "Pan-cultural elements in facial displays of emotion", In Journal of Science, vol. 164, Issue 3875, Apr. 4, 1969, pp. 85-88.

Goldin-Meadow, Susan, "The role of gesture in communication and thinking", In Journal of Trends in Cognitive Sciences, vol. 3, Issue 11, Nov. 1, 1999, pp. 419-429.

Hansen, et al., "D4.1 Design specifications and guidelines for COGAIN eye-typing systems", http://wiki.cogain.org/images/a/a7/COGAIN-D4.1.pdf, Published on: Oct. 19, 2005, 1-26 pages.

Higginbotham, D. Jeffery, "Humanizing Vox Artificialis: The Role of Speech Synthesis in Augmentative and Alternative Communication", In Proceedings of Computer Synthesized Speech Technologies: Tools for Aiding Impairment: Tools for Aiding Impairment, Jan. 31, 2010, pp. 50-69.

Huenerfauth, et al., "Evaluating importance of facial expression in american sign language and pidgin signed english animations", The proceedings of the 13th international ACM SIGACCESS conference on Computers and accessibility, Oct. 24, 2011., pp. 99-106.

Kane, et al., "At times avuncular and cantankerous, with the reflexes of a mongoose": Understanding Self-Expression through Augmentative and Alternative Communication Devices, In Proceedings of the 20th ACM Conference on Computer-Supported Cooperative Work and Social Computing, Oct. 4, 2016, 14 pages.

Majaranta, et al., "Twenty years of eye typing: systems and design issues", In Proceedings of the symposium on Eye tracking research & applications, Mar. 25, 2002, 8 pages.

"MARY Text-to-Speech", http://mary.dfki.de/, Retrieved on: Oct. 4, 2016, 1 pages.

Nathanson, Esther "Native voice, self-concept and the moral case for personalized voice technology", In Journal of Disability and Rehabilitation, Feb. 16, 2016.

"Nuance:—Loquendo TTS Demo", http://www.nuance.com/for-business/by-solution/customer-service-solutions/solutions-services/inbound-solutions/loquendo-small-business-bundle/tts-demo/english/index.htm, Retrieved on: Oct. 4, 2016, 4 pages.

Pauletto, et al. "Exploring Expressivity and Emotion with Artificial Voice and Speech Technologies", In Journal of Logopedics Phoniatrics Vocology, vol. 38, Issue 3, Oct. 2013, pp. 1-11.

Pitrelli, et al. "The IBM Expressive Text-to-Speech Synthesis System for American English", In Proceedings of IEEE Transactions on Audio, Speech, and Language Processing, vol. 14, No. 4, Jul. 2006, pp. 1099-1108.

Colin Portnuff, "AAC—A User's Perspective", http://aac-rerc.psu.edu/index-8121.php.html, Published on: Oct. 18, 2006, 8 pages.

Scherer, et al. "Multimodal expression of emotion: affect programs or componential appraisal patterns?", In Journal of Emotion, vol. 7, Issue 1, Feb. 7, 2007.

Schroder, Marc "Expressive Speech Synthesis: Past, Present, and Possible Futures", In Publication of Springer, May 2009, 15 pages.

"System Usability Scale (SUS)", https://www.usability.gov/how-to-and-tools/methods/system-usability-scale.html, Retrieved on: Oct. 4, 2016, 2 pages.

Szekely, et al. "WinkTalk: a demonstration of a multimodal speech synthesis platform linking facial expressions to expressive synthetic voices", In Proceedings of the Third Workshop on Speech and Language Processing for Assistive Technologies, Jun. 7, 2012, pp. 5-8.

"Text to Speech", http://www.ibm.com/watson/developercloud/text-to-speech.html, Retrieved on: Oct. 4, 2016, 4 pages.

Pullin, et al., "17 Ways to Say Yes: Toward Nuanced Tone of Voice in AAC and Speech Technology", In Journal of Augmentative and Alternative Communication, vol. 31, Issue 2, May 12, 2015, 170-180 pages.

* cited by examiner

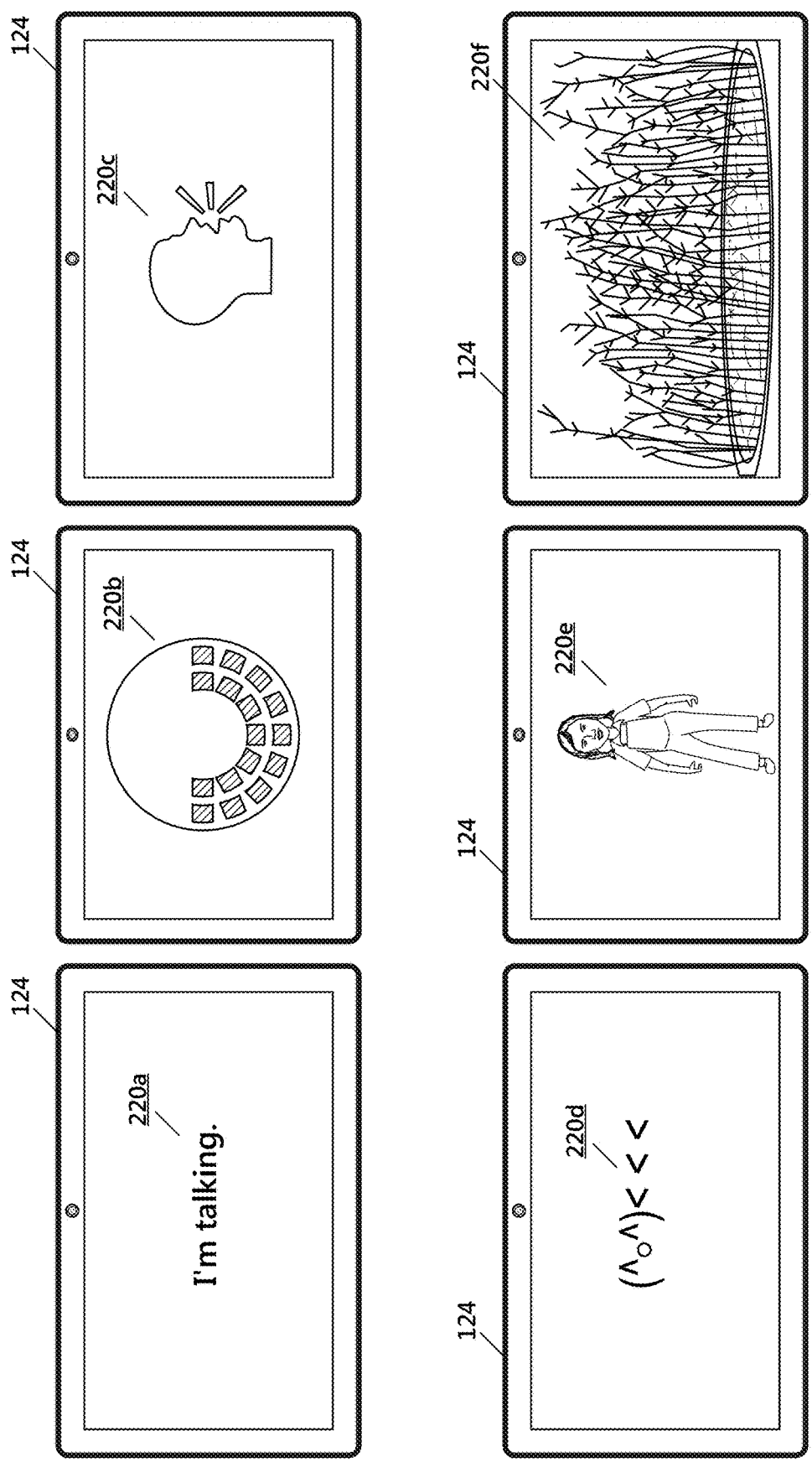

MOBILE COMPUTING DEVICE

USER INTERFACE FOR GENERATING EXPRESSIVE CONTENT

BACKGROUND

Alternative and augmentative communication (AAC) includes forms of communication other than oral speech that are used to express thoughts, needs, wants, or ideas. An individual may rely on an AAC system as an aid to communicate when the individual is not able to communicate orally, for example, due to a speech disability. Some AAC systems are operative to synthesize speech from the individual's input.

Conveying emotions, attitude, or tone through speech is oftentimes dependent on non-verbal communicative features, such as gestures and speech prosody; however, current speech-generating AAC systems do not support conveyance of non-verbal information, and generally only provide users with a text-to-speech engine and voice fonts that synthesize a single flat tone of speech that is mostly devoid of emotion and expressivity regardless of the input text that the AAC user is intending to convey. For example, synthesized speech generated from an AAC user's input may sound robotic and lack volume and vocal inflection, which makes it difficult for the AAC user to effectively communicate in a way that represents the user's internal voice. As can be appreciated, this can negatively impact AAC users' quality of life, specifically in their interactions with other individuals.

Oftentimes, to try to convey emotion or expressivity, an AAC user will type and speak an additional explanatory phrase, such as "I am angry" before typing and speaking the phrase that the user intended to speak originally. As can be appreciated, this is inefficient and can present a significant burden to AAC users, particularly when using gaze-based text entry, for which AAC users have a typical text entry rate of between 10-20 words per minute.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for generating expressive content. By employing aspects of the present disclosure, an improved user experience is provided, where a user is enabled to efficiently and effectively compose expressive content, such as prosody-enhanced speech, sound effects, or visual effects, using voicesetting editing.

An expressive synthesized speech system provides an expressive keyboard for enabling the user to input textual content and for selecting expressive operators, such as emoji objects or punctuation objects for applying predetermined prosody attributes, sound effects, or visual effects to the user's textual content. In some examples, the user may selectively enter a voicesetting editor mode, where a voicesetting editor UI is displayed for enabling the user to author or adjust particular prosody attributes associated with the user's content. In some examples, an active listening mode is provided. When the user selects to launch the active listening mode, a set of active listening mode effect options are displayed, wherein each effect option is associated with a particular sound effect and/or visual effect. In conversations, the user is enabled to easily and rapidly respond with expressive vocal sound effects or visual effects while listening to others speak. Because the user does not have to type and speak additional explanatory phrases to communicate emotions or expressivity, fewer processing resources are expended to provide input to the expressive synthesized speech system, and the functionality of the computing device used to provide the expressive synthesized speech system is thereby expanded and improved.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2E-2I are illustrations of example user interface displays generated by aspects of the expressive synthesized speech system showing examples of visual effects/output corresponding to various ALM effect options;

DETAILED DESCRIPTION

Figure 1:
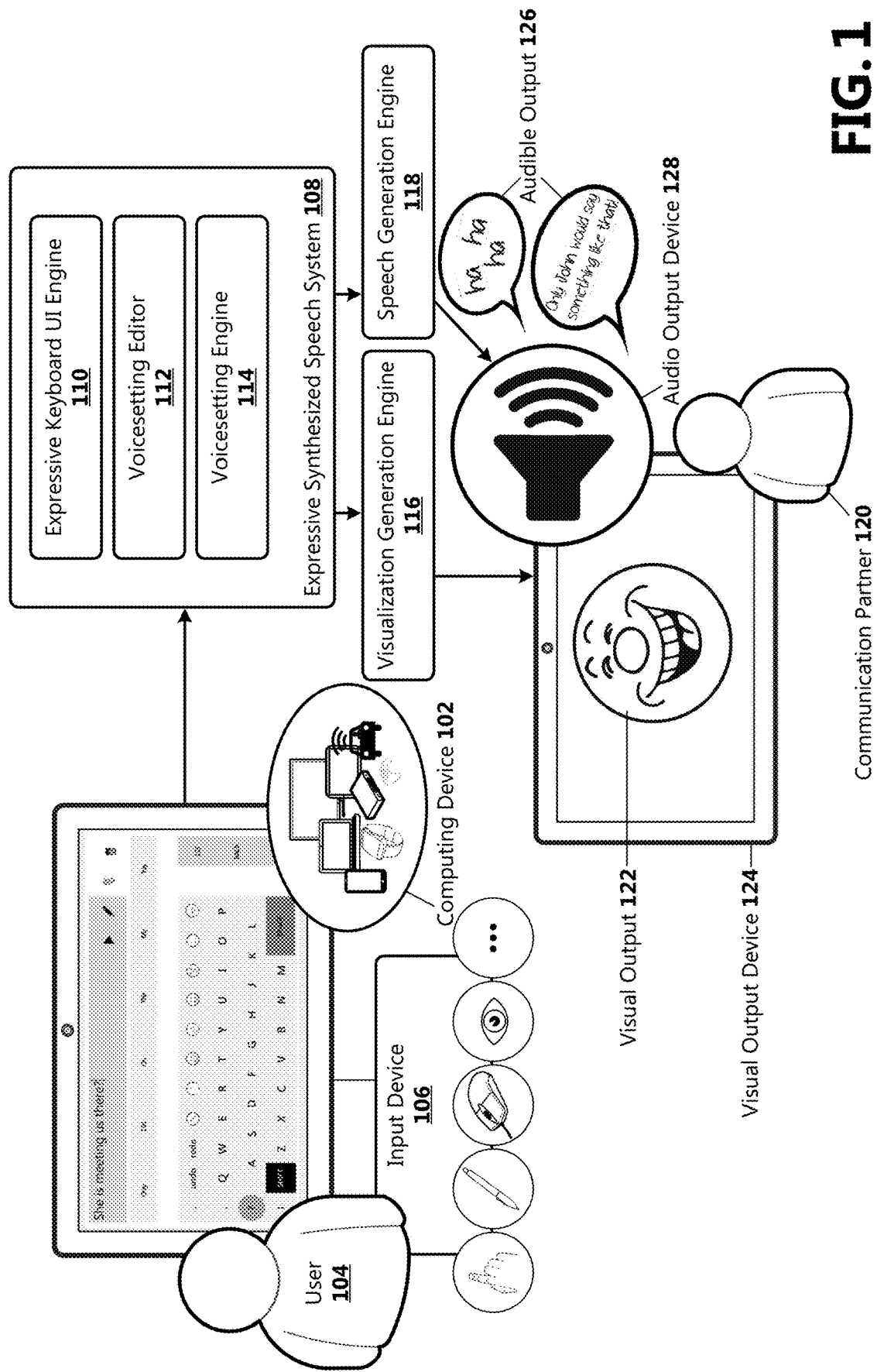
FIG. 1 is a block diagram showing an example operating environment including components of an expressive synthesized speech system for generating expressive content.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing intuitive synthesized speech-authoring user interface for generating expressive content. While many of the examples described herein are directed to generating expressive content in an alternative and augmentative communication (AAC) system, as should be appreciated, aspects are equally applicable in a variety of alternative use cases and systems. For example in addition to providing synthesized speech-authoring user interfaces to users who are reliant on an AAC system to generate content, such as users who have communication challenges stemming from severe motor disabilities, synthesized speech-authoring user interfaces may also be used for authoring or marking up documents that are to be rendered to audio by automated or semi-automated means (e.g., marking up a print edition book to be rendered to an audio book, authoring a document to be rendered by a screen reader program, authoring content in a web-based communication service, and authoring content that is to be read aloud by learning tool systems). With reference now to FIG. 1, a block diagram of an example operating environment 100 illustrating aspects of an example expressive synthesized speech system 108 for generating expressive content is shown. The expressive synthesized speech system 108 is operative to provide improved synthesized speech-authoring user interfaces via which a user 104 is enabled to efficiently and effectively author content for generating expressive output, such as prosody-enhanced speech, sound effects, and visual effects. For example, prosody-enhanced speech includes speech that comprises variables of timing, phrasing, emphasis, and intonation that speakers use to help convey aspects of meaning and to make speech lively.

The example operating environment 100 includes an electronic computing device 102. The computing device 102 illustrated in FIG. 1 is illustrated as a tablet computing device; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 5, 6A, 6B, and 7.

According to aspects, the user 104 utilizes the computing device 102 for executing the expressive synthesized speech system 108, which in association with a text-to-speech engine (i.e., speech generation engine 118), generates expressive synthesized speech from the user's input. The computing device 102 includes or is in communication with the expressive synthesized speech system 108. In one example, the computing device 102 includes an expressive synthesized speech application programming interface (API), operative to enable an application executing on the computing device to employ the systems and methods of the present disclosure via stored instructions.

In examples, the synthesized speech system 108 is operative to receive input (e.g., text input, mode selections, on-screen object selections, and prosody cue input) from a user-controlled input device 106 via various input methods, such as those relying on mice, keyboards, and remote controls, as well as Natural User Interface (NUI) methods, which enable a user to interact with the computing device 102 in a "natural" manner, such as via technologies including touch sensitive displays, voice and speech recognition, intention and goal understanding, motion gesture detection using depth cameras, motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). In specific examples, the user 104 uses gaze-based input methods or head mouse input methods, which are typically used by individuals who have communication challenges stemming from paralysis or severe motor disabilities, such as people who have advanced amyotrophic lateral sclerosis (ALS).

Aspects of the expressive synthesized speech system 108 generate and provide a graphical user interface (GUI) that allows the user 104 to interact with functionality of the expressive synthesized speech system 108. According to examples, the expressive synthesized speech system 108 comprises an expressive keyboard UI engine 110, illustrative of a software module, system, or device operative to generate a GUI display of an expressive keyboard. According to one aspect, the expressive keyboard UI engine 110 provides a keyboard that extends an on-screen keyboard, which is used to input text for speech synthesis, by providing a set of selectable icons or emoji objects that can be selectively inserted into the user's text. Each emoji object illustrates a particular emotion (e.g., sad, calm, happy, funny, sarcastic, surprised, irritated, angry), and is associated with a predefined operation or operations that can change the tone of voice of the user's text to a specified emotional state (e.g., sad, calm, happy, funny, sarcastic, surprised, irritated, angry). For example, certain prosodic attributes are applied to the user's text based on the selected emoji object. According to one example, the expressive synthesized speech system 108 is operative to apply a tone and emotion of output speech corresponding to a selected emoji object at a sentence level. According to an aspect, the expressive keyboard UI engine 110 is operative to intelligently display a set of emoji objects on the expressive keyboard, for example, based on linguistic properties of the user's textual input or based on a recognized emotional state of the user detected via a sensor (e.g., biometric sensors, facial expression sensors, body posture sensors, gesture sensors). For example, the set of emoji objects may include emoji objects associated with an emotion corresponding to the user's recognized emotional state. In some examples, one or more emoji objects are associated with a vocal sound effect (e.g., laughter, sarcastic scoff, sharp breath in, grunt, sigh, or a disgusted "ugh" sound). When the user 104 selectively inserts an emoji object, a corresponding vocal sound effect is inserted at the beginning, end, or within the user's synthesized speech.

According to an aspect, the expressive keyboard UI engine 110 is operative to receive the user's text input and selection of an emoji object, and communicate the input and selection to a voicesetting engine 114. The voicesetting engine 114 is illustrative of a software module, system, or device operative to receive user input, apply the predefined operation associated with the selected emoji object to apply speech or prosodic properties to the text input, and output a representation of the user's speech to a speech generation engine 118 for generating audible output 126 embodied as expressive synthesized speech. In some examples, the voicesetting engine 114 comprises an index of emoji objects and their corresponding operation(s), which includes prosodic attributes and/or vocal sound effects. The voicesetting engine 114 is operative to reference the index for applying the appropriate prosodic attributes and/or vocal sound effect to the user's text. According to an aspect, the voicesetting engine 114 specifies the text input and prosodic attributes and/or vocal sound effects via a markup language, such as Speech Synthesis Markup Language (SSML), which is output to a speech generation engine 118. The audible output 126 is played on an audio output device 128, which may be integrated with the user's computing device 102, or may be incorporated in another device utilized by a communication partner 120.

In some examples, the expressive synthesized speech system 108 works in association with a visualization generation engine 116 for generating expressive visual output 122 for display on a visual output device 124 from the user's input. For example, the predefined operation or operations associated with each emoji object may include providing a visual feature, wherein each emoji object may be associated with one or more visual features (e.g., text, emoji, graphics, animations, video clips). When the user 104 selectively inserts an emoji object into the user's text input, the expressive keyboard UI engine 110 is operative to communicate the text input and the selected emoji object to the voicesetting engine 114, wherein the voicesetting engine applies the predefined operation associated with the selected emoji object to apply visual features to the text input, and output a representation of the visual features to a visualization generation engine 116 for generating visual output 122 for display on a visual output device 124. The visual output device 124 may be integrated with the user's computing device 102, or may be incorporated in another device utilized by a communication partner 120. In some examples, the visual output device 124 and the audio output device 128 are incorporated in a single device.

According to another aspect, the expressive keyboard UI engine 110 is further operative to provide a plurality of punctuation objects (e.g., a period, comma, question mark, exclamation point), which when selectively inserted into the user's text, change prosodic attributes (e.g., silent space, pitch, speed, emphasis) of surrounding words. In some examples, a settings menu is provided for enabling the user to customize the prosodic attributes or vocal sound effects associated with emoji objects or to customize the prosodic attributes associated with punctuation objects.

According to another aspect, the expressive keyboard UI engine 110 is further operative to provide a selectable active listening mode (ALM) for enabling the user 104 to select vocal sound effects and/or visual effects for communicating information when a communication partner 120 is speaking. For example, akin to using gestures, such as nodding, or non-verbal vocalizations, such as laughing, in standard communication, the user 104 is enabled to use ALM effects to provide feedback to the user's communication partner 120. According to examples, the expressive keyboard UI engine 110 is operative to provide an ALM command, which when selected, causes the expressive keyboard UI engine to display a plurality of selectable ALM effect options, wherein each ALM effect option is associated with a particular sound effect and/or visual effect. In some examples, the ALM effect options and associated sound or visual effects are customizable by the user 104. For example, the user 104 is enabled to select specific ALM effect options to display on the keyboard. In one example, voice-banked recordings may be associated with sound effect options. For example, a voice-banked phrase or other sound effect may be previously recorded by the user 104 or another individual and saved as a sound effect that can be selectively played or spoken by the expressive synthesized speech system 108 during a conversation with a communication partner 120. In another example, an expression-banked reaction may be previously recorded by the user 104 or another individual and saved as a visual effect that can be selectively displayed by the expressive synthesized speech system 108 during a conversation with a communication partner 120. Further, the user 104 may save a static image or a video clip as a visual effect.

According to an aspect, the expressive keyboard UI engine 110 is operative to receive the user's ALM effect option selection, and communicate the selection to the voicesetting engine 114 for outputting a representation of the associated ALM effect to an audio output device 128 and/or to a visual output device 124. The expressive keyboard UI engine 110 is operative to communicate the selected ALM effect option to the voicesetting engine 114, wherein the voicesetting engine applies the predefined operation associated with the selected ALM effect option to provide audible features or visual features associated with the selected ALM effect option as output to a visualization generation engine 116 for generating visual output 122 for display on a visual output device 124 or to an speech generation engine 118 for generating audible output 126 for playback on an audio output device 128.

Aspects of the expressive keyboard UI engine 110 enable single-click input by the user 104 to quickly and easily specify the expressive nature of their speech and to rapidly respond with expressive vocal sound effects while listening to others speak. Aspects of the expressive keyboard including the emoji objects, punctuation objects, and the ALM effect options will be described in further detail below with reference to FIGS. 2A-2P.

With reference still to FIG. 1, the expressive synthesized speech system 108 further comprises a voicesetting editor 112 illustrative of a software module, system, or device operative to provide a GUI that allows the user 104 to modify various prosodic properties associated with text input for asynchronously authoring expressivity of synthesized speech (e.g., outside of a face-to-face conversation). In some examples, the text input includes text composed via interaction with the expressive keyboard. In other examples, the text input includes text in an existing text file which the user 104 is enabled to upload into the expressive synthesized speech system 108. The voicesetting editor 112 is operative to provide various controls for enabling the user 104 to edit various properties of the output speech via coarse input methods, such as via eye gaze or head mouse movement. According to aspects, the user 104 is enabled to add detailed pacing, emotional content, or prosodic content to text before the text is rendered as speech. For example, the voicesetting editor 112 provides controls for editing pause length, pitch, speed, or emphasis of specific text, and for inserting sound effects and/or visual effects. According to examples, the user 104 may utilize the UI provided by the voicesetting editor 112 when the user wants to have a higher degree of control over specifics of how the user's text will be spoken when played by an audio output device 128. For example, the voicesetting text via the voicesetting editor 112 typically entails additional time, and may be used by the user 104 in a situation where the user is preparing text to speak in advance (e.g., before a medical appointment, before giving a public speech, when preparing stored phrases for repeated use). Aspects of the voicesetting editor 112 will be described in further detail below with respect to FIGS. 3A-3G.

Figure 2A:
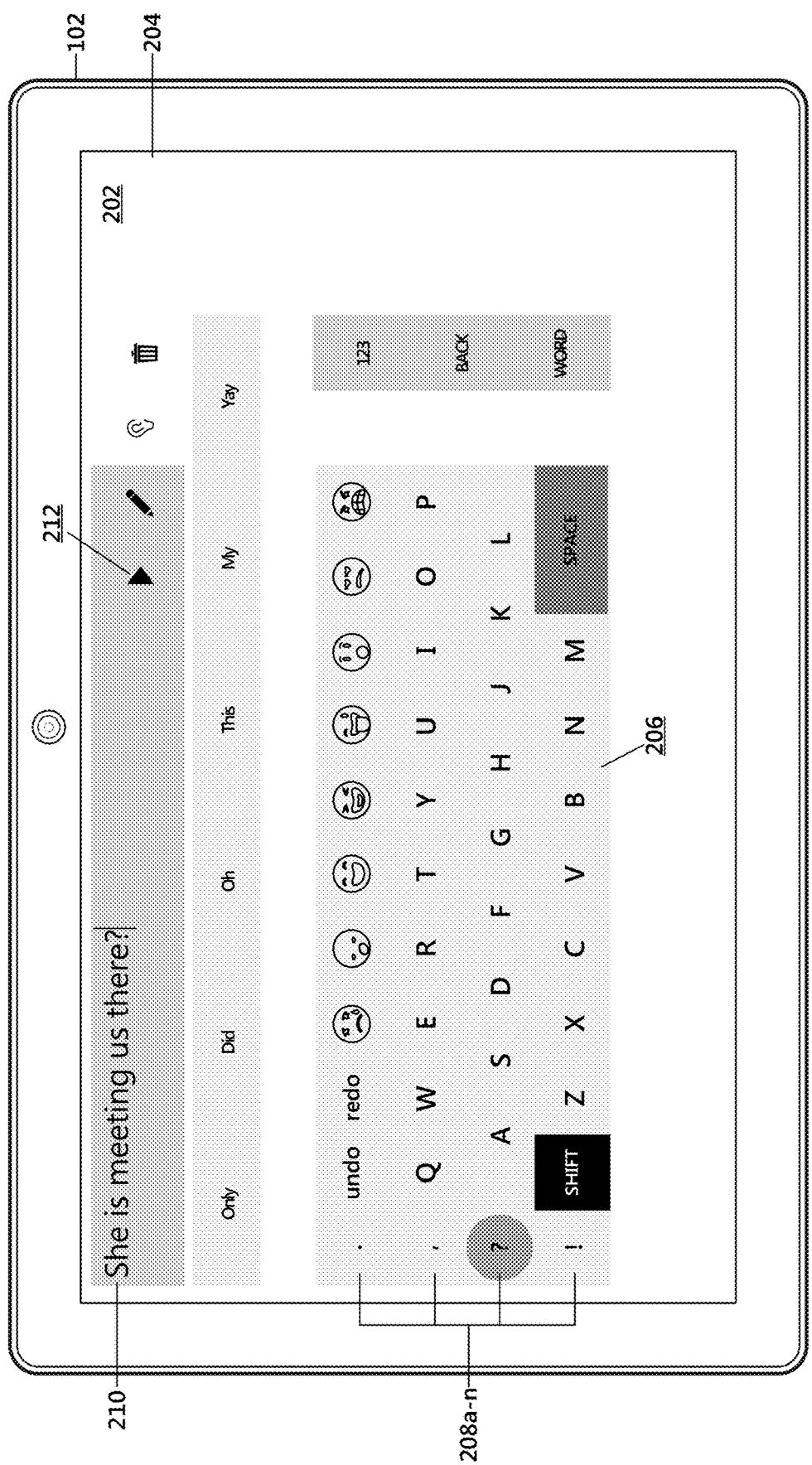
FIG. 2A is an illustration of an example user interface display generated by aspects of an expressive synthesized speech system showing an expressive keyboard including selectable punctuation objects.

As described above, the expressive synthesized speech system 108 is operative to provide intuitive synthesized speech-authoring user interfaces via which the user 104 is enabled to efficiently and effectively author content for generating expressive output, such as prosody-enhanced speech, sound effects, and visual effects. Examples of synthesized speech-authoring user interfaces provided by the expressive synthesized speech system 108 are described below with reference to FIGS. 2A-3G. With reference now to FIG. 2A, an illustration of an example UI displayed on a display 204 of a computing device 102 and generated by aspects of an expressive synthesized speech system 108 is shown. According to various aspects, the expressive keyboard UI engine 110 is operative to generate an expressive synthesized speech system UI 202 including an expressive keyboard 206 for enabling the user 104 to provide text input 210, prosodic cue selections, and sound and/or visual effect selections. Examples of the expressive keyboard 206 include an alpha-numeric keyboard, which the user 104 is enabled to use to select letters and numbers to author textual content 210 for speech synthesis. In some examples, the expressive keyboard 206 is a gaze-based on-screen keyboard, wherein eye tracking is used to determine the user's gaze position, which is utilized as a cursor. For example, to enter text 210, the user 104 may gaze on letters, numbers, or other displayed keys of the on-screen keyboard. In other examples, the expressive keyboard 206 enables input via a head mouse input device 106, where the user's head movements are translated into mouse pointer movement. In other examples, other input device 106 types are used for inputting textual content and providing selections.

Examples of the expressive keyboard 206 further include a plurality of selectable punctuation objects 208*a-n* (collectively, 208), which the user 104 is enabled to include with textual input 210 to specify the expressive nature of the textual input. According to aspects, each punctuation object 208 has a predetermined operation associated with it that specifies how particular prosodic attributes are to be applied to surrounding text, thus changing the expressive nature of the speech that will be generated from the text.

For example, inclusion of a period, comma, or exclamation point punctuation object 208 may operate to insert a default or user-customizable amount of silent space between pronouncing words or sentences, thus allowing the user 104 to set the cadence of his/her speech. As another example, inclusion of a single question mark punctuation object 208 may operate to raise the pitch of a word located immediately prior to the question mark, and inclusion of two question mark punctuation objects may operate to raise the pitch of the two words located immediately prior to the question marks to emphasize that the textual content 210 is a question. As can be appreciated, this can be useful in scenarios in which the user 104 asks a question that could be interpreted as a statement if not for the question mark(s) (e.g., "She is meeting us there." vs "She is meeting us there?"). As another example, inclusion of an exclamation point punctuation object 208 may operate to increase the emotional tone, volume, or rate of speech of at least a portion of the textual content 210, or to place emphasis on a specific word of the textual content. As should be appreciated, the punctuation objects 208 illustrated in the figures and described herein are non-limiting examples. Other punctuation objects 208 and other corresponding operations are possible and are within the scope of the present disclosure.

According to an aspect, the user 104 may enter textual content 210, select a punctuation object 208, and then select to play the text with the punctuation object functionality applied. For example, the user 104 may select a play command 212, which when selected, causes the expressive keyboard UI engine 110 to pass the textual content 210 and the selected punctuation object 208 to the voicesetting engine 114 for application of the prosodic attributes or prosodic properties corresponding to the selected punctuation object to the textual content.

Figure 2B:
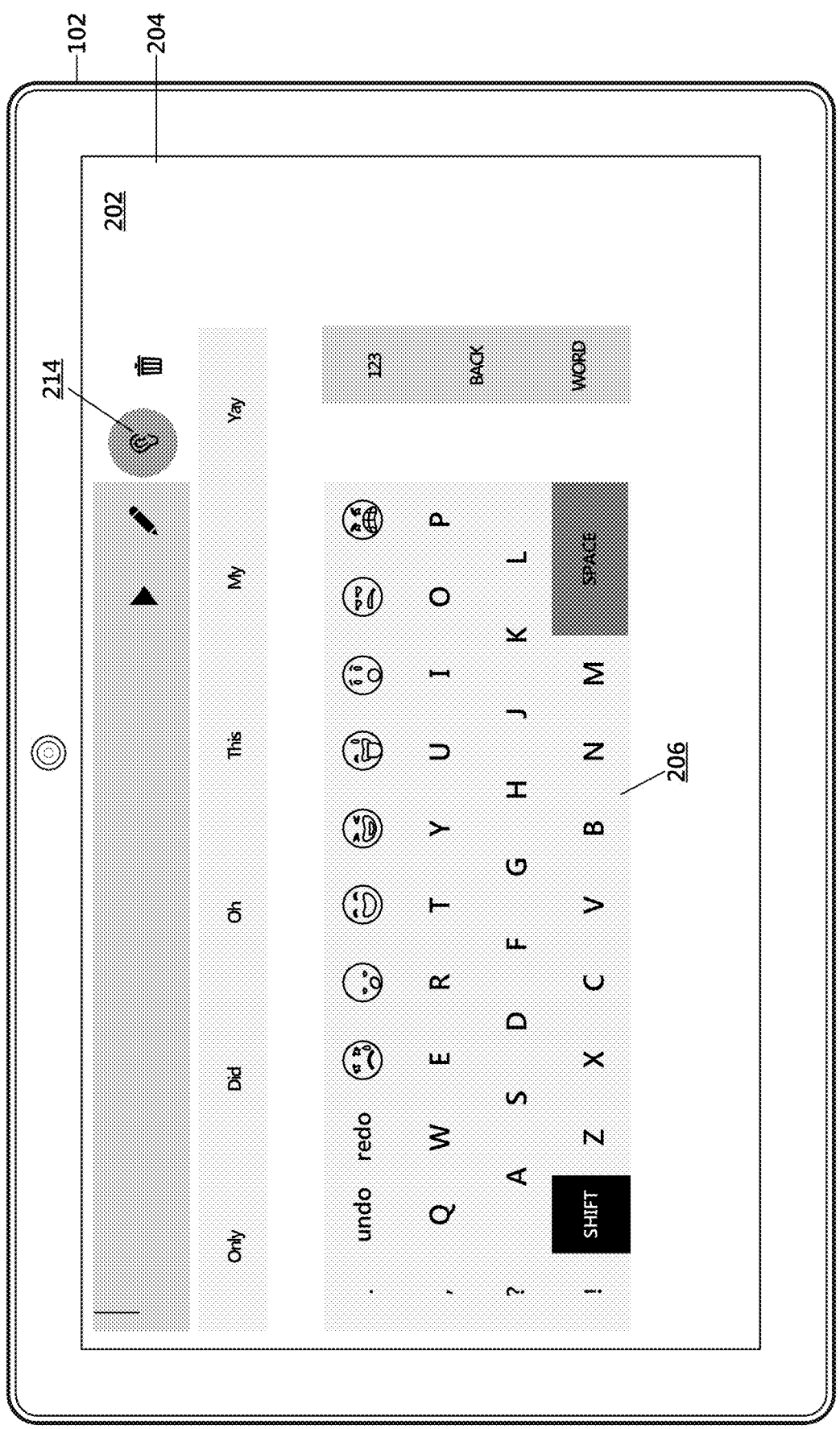
FIG. 2B is an illustration of an example user interface display generated by aspects of the expressive synthesized speech system showing a selection of an active listening mode (ALM)
Figure 2C:
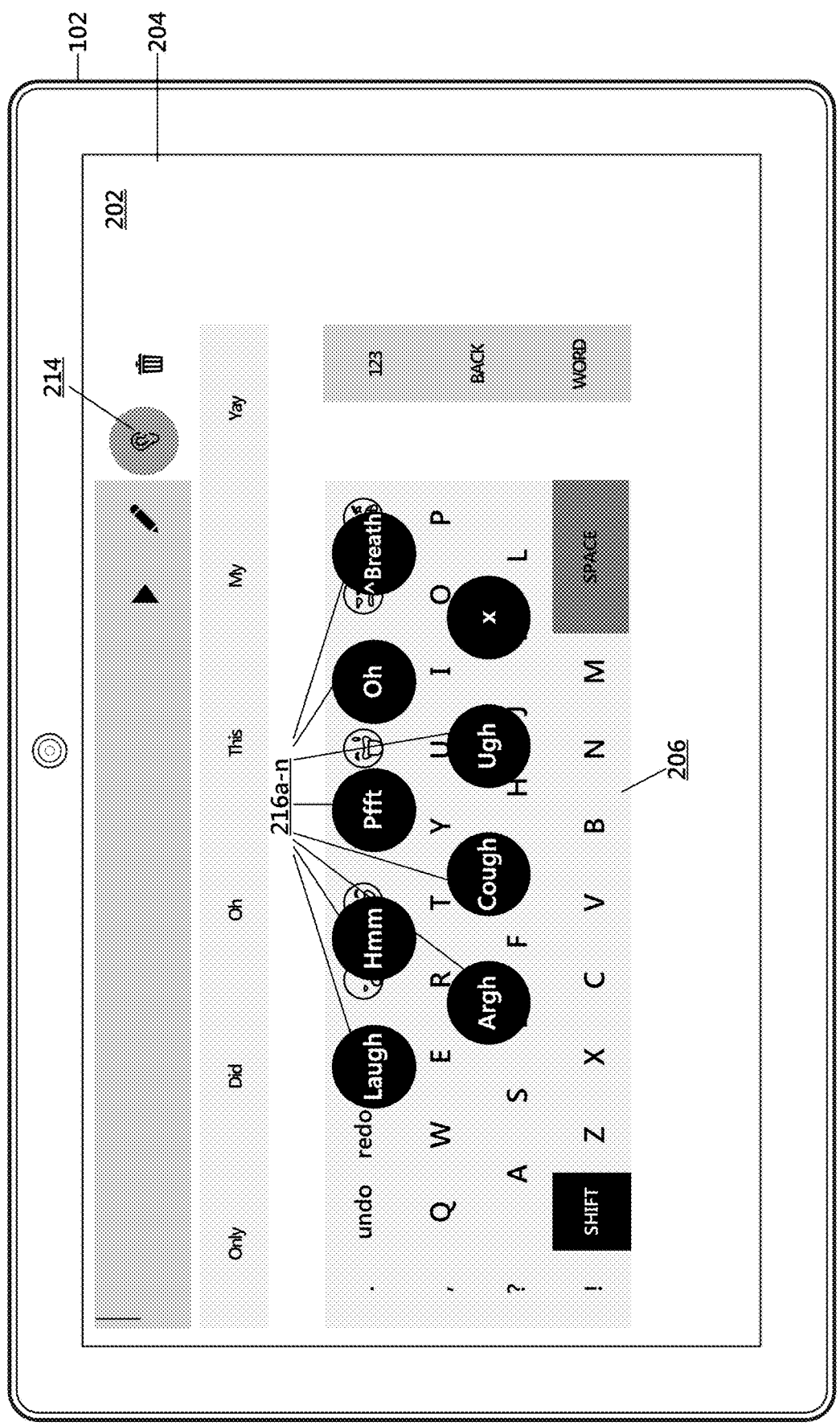
FIG. 2C is an illustration of an example user interface display generated by aspects of the expressive synthesized speech system showing a plurality of selectable ALM effect options.

As illustrated in FIG. 2B, the expressive keyboard 206 further includes a selectable ALM (active listening mode) command 214, which when selected, causes the expressive synthesized speech system 108 to enter an active listening mode and the expressive keyboard UI engine 110 to display a plurality of selectable ALM effect options 216*a-n* (collectively, 216), wherein each ALM effect option is associated with a particular sound effect and/or visual effect that can be selectively communicated to a communication partner 120. For example, selection of an ALM effect option 216 enables the user 104 to provide rapid expressive reactions when the communication partner 120 is speaking. With reference now to FIG. 2C, a plurality of example selectable ALM effect options 216 are illustrated. As described above, the ALM effect options 216 provide the synthesized speech user 104 with single-click access to a variety of sound effects and/or visual effects, which in various examples, are customizable by the synthesized speech user. Although the example ALM effect options 216 illustrated in FIG. 2C are displayed as text, other display options are possible, such as images or symbols.

Figure 2D:
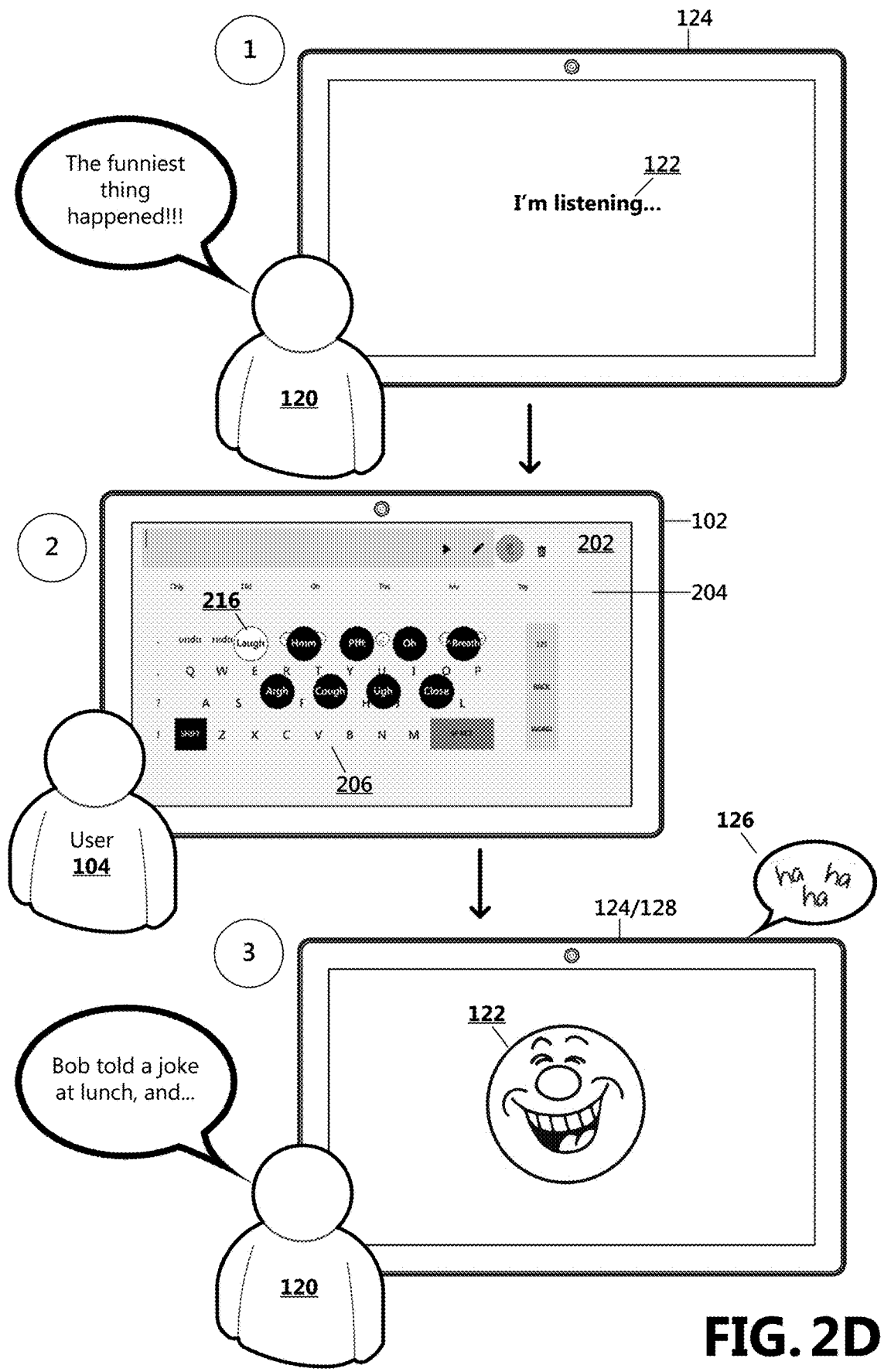
FIG. 2D is an illustration of an example user interface display generated by aspects of the expressive synthesized speech system showing an example communication between a user and a conversation partner, wherein the user is enabled to use the ALM to provide feedback.
Figure 2E:
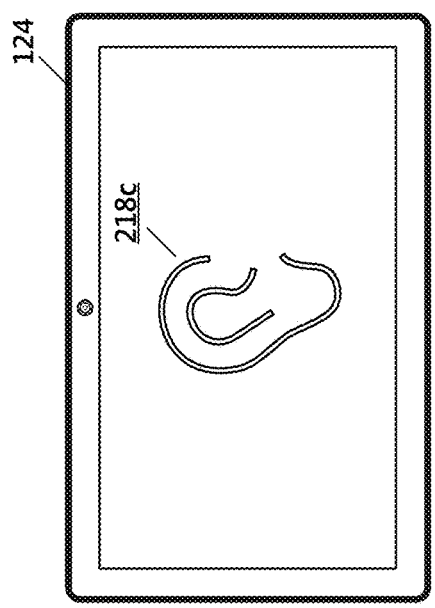
Figure 2E:
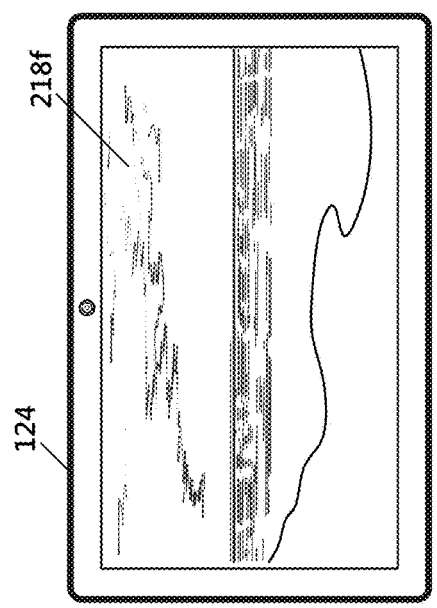
Figure 2E:
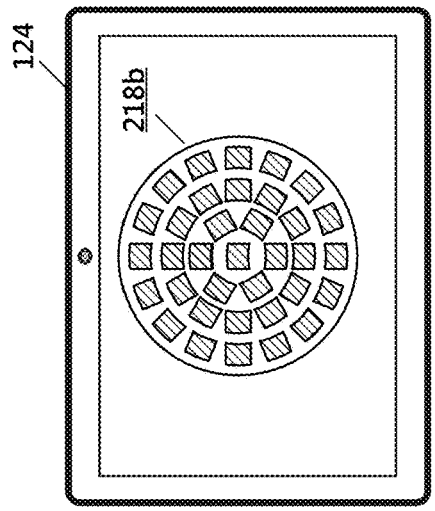
Figure 2E:
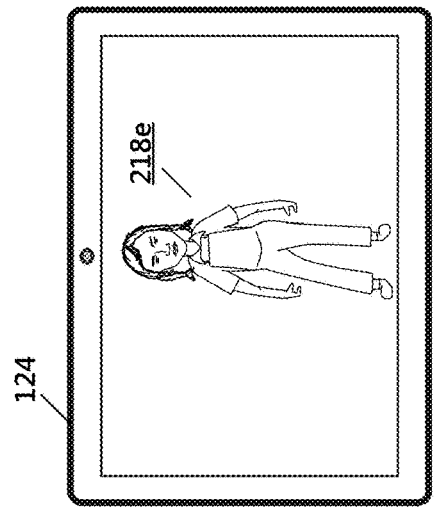
Figure 2E:
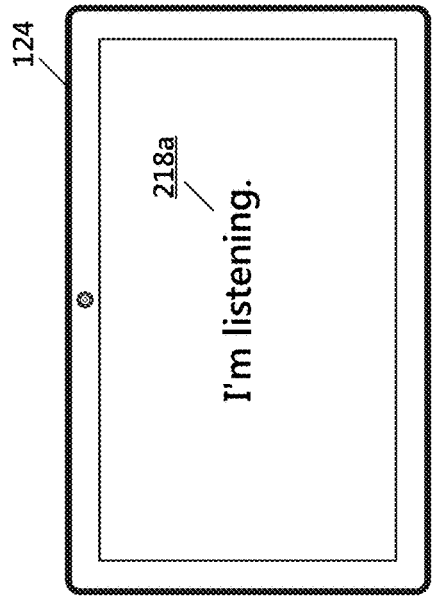
Figure 2E:
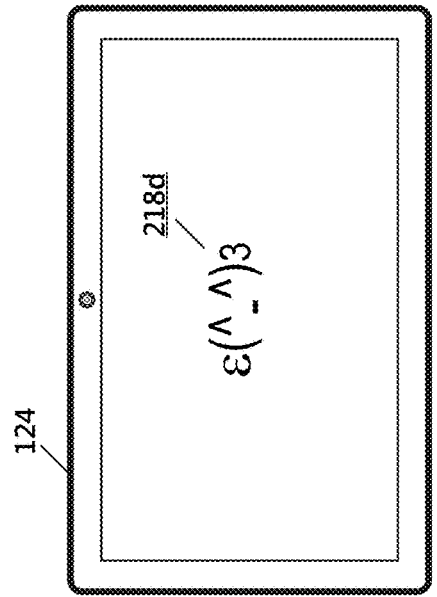

According to an example and as illustrated in FIG. 2D, a user 104 and a communication partner 120 may have a conversation. The first step depicts the communication partner 120 talking, and the user 104 providing communication feedback to the communication partner 120 in the form of an "I'm listening" visual effect/output 122 that can be rendered on the communication partner's visual output device 124 in response to a selection of an ALM effect option 216. The second step depicts the user 104 selecting another ALM effect option 216 for providing another visual effect and/or sound effect to communicate with the communication partner 120. For example, as the communication partner 120 is telling the user 104 a funny story, the user selects a "laugh" ALM effect option 216. Accordingly, as depicted in the third step, a corresponding visual effect/output 122 is displayed on the communication partner's visual output device 124, and a corresponding sound effect/output 126 is played on the communication partner's audio output device 128. As illustrated, the user 104 is enabled to provide rapid expressive reactions during a conversation.

According to aspects, a variety of ALM effect options 216 may be provided in the expressive keyboard 206, and a variety of corresponding audio (sound) effects/output 126 and visual effects/output 122 may be provided responsive to a selection of an ALM effect option. Various examples of visual effects/output 122 corresponding to various ALM effect options 216 are illustrated in FIGS. 2E-2I. According to one example and with reference to FIG. 2E, an "I'm listening" ALM effect option 216 may be provided, which when selected may provide a visual effect/output 122 for display on a visual output device 124, such as the communication partner's visual output device. The visual effect may be embodied as one or more visual features representing the selected ALM effect option 216, such as text 218*a* saying "I'm listening," an animated dot object 218*b* indicating that the user 104 is listening, an icon or clipart 218*c* illustrating that the user is listening, an emoticon 218*d* portraying listening, an animated avatar 218*e*, or a video clip 218*f* that symbolizes listening.

According to another example and with reference to FIG. 2F, an "I'm talking" ALM effect option 216 may be provided, which when selected may provide a visual effect/output 122 for display on a communication partner's visual output device 124. The visual effect may be embodied as one or more visual features representing the selected ALM effect option 216 such as text 220*a* saying "I'm talking," an animated dot object 220*b* indicating that the user 104 is talking, an icon or clipart 220*c* illustrating that the user is talking, an emoticon 220*d* portraying talking, an animated avatar 220*e*, or a video clip 220*f* that characterizes talking.

Figure 2G:
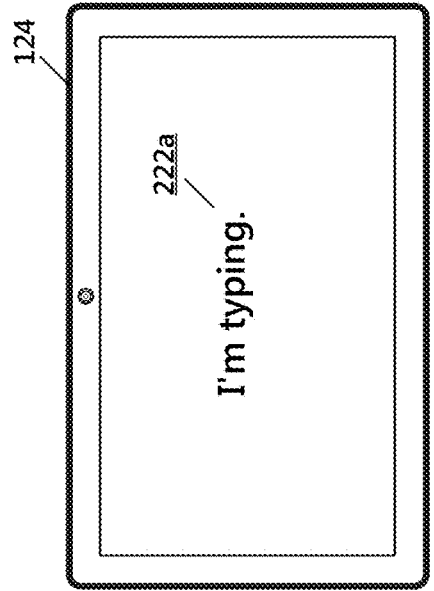
Figure 2G:
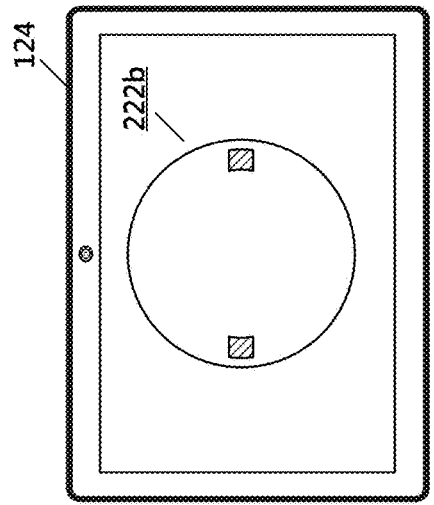
Figure 2G:
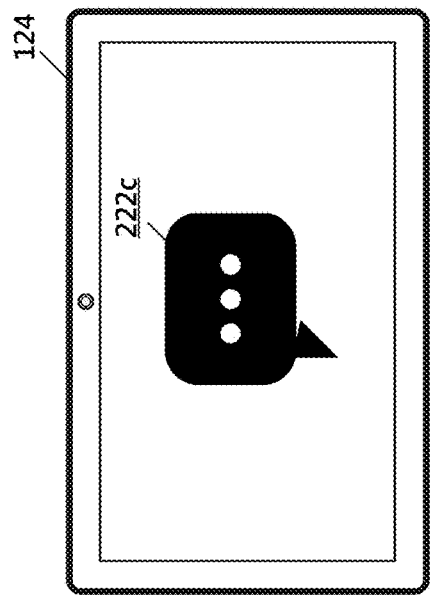
Figure 2G:
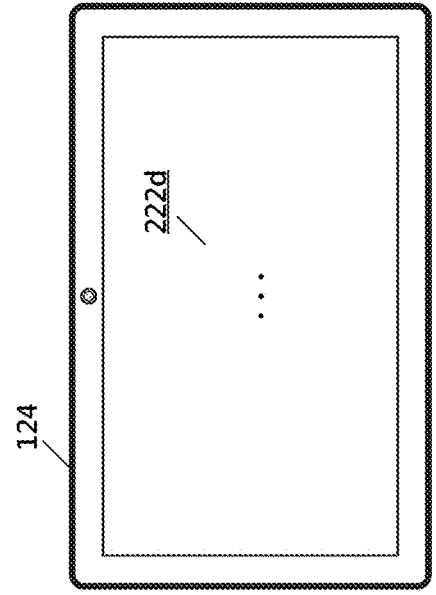
Figure 2G:
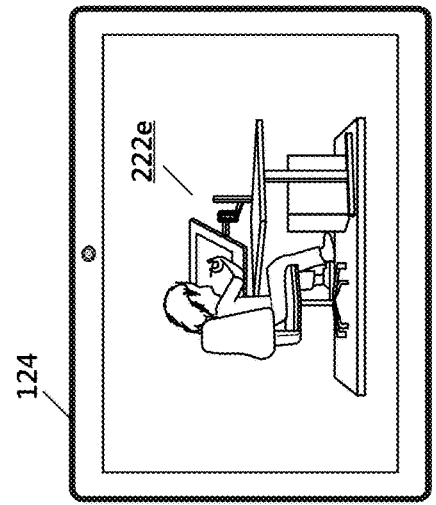
Figure 2G:
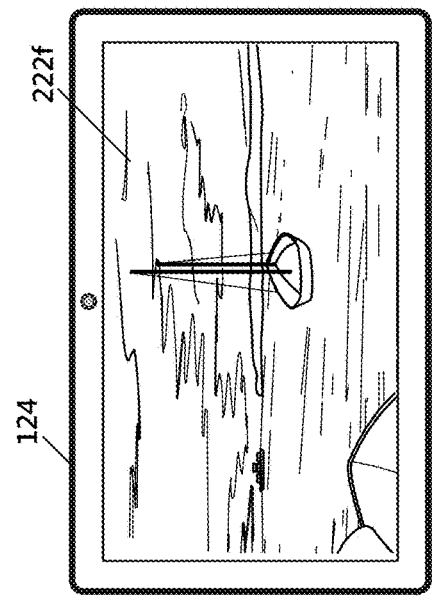

According to another example and with reference to FIG. 2G, an "I'm typing" ALM effect option 216 may be provided, which when selected may provide a visual effect/output 122 for display on a communication partner's visual output device 124. The visual effect may be embodied as one or more visual features representing the selected ALM effect option 216 such as text 220*a* saying "I'm typing," an animated dot object 220*b* indicating that the user 104 is typing, an icon or clipart 220*c* illustrating that the user is typing, an emoticon 220*d* portraying typing, an animated avatar 220*e*, or a video clip 220*f* that characterizes typing or waiting for the user to finish typing.

Figure 2H:
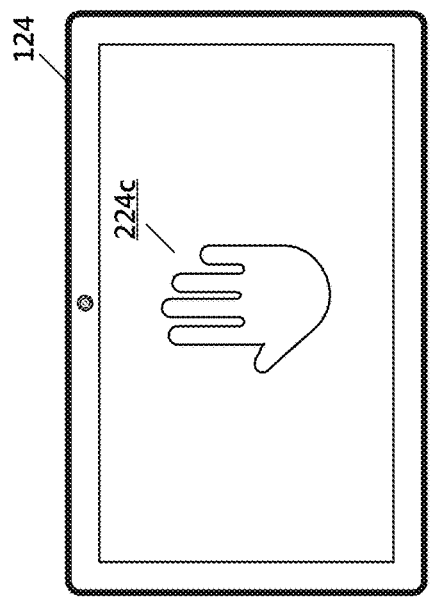
Figure 2H:
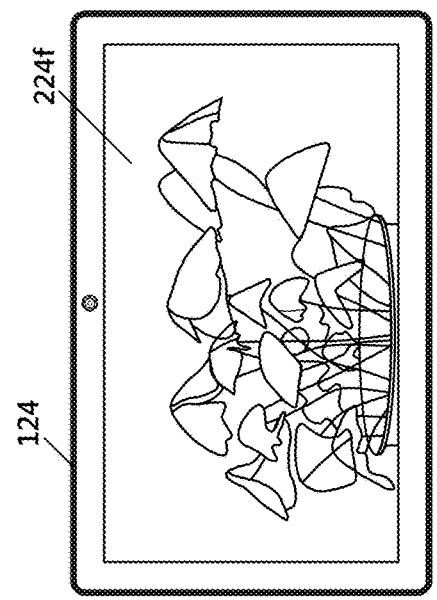
Figure 2H:
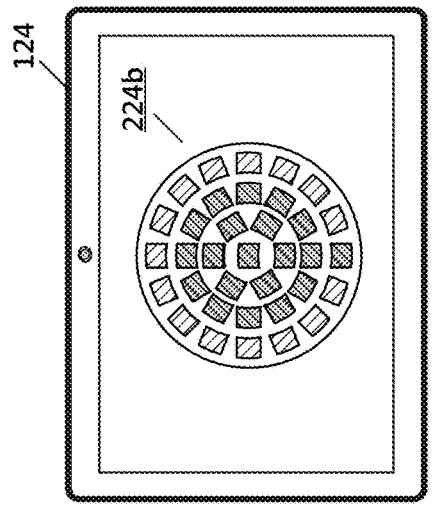
Figure 2H:
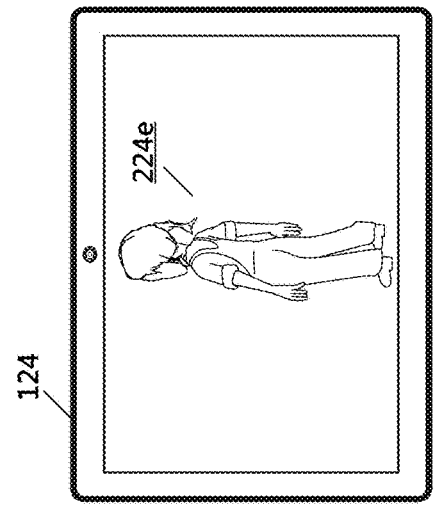
Figure 2H:
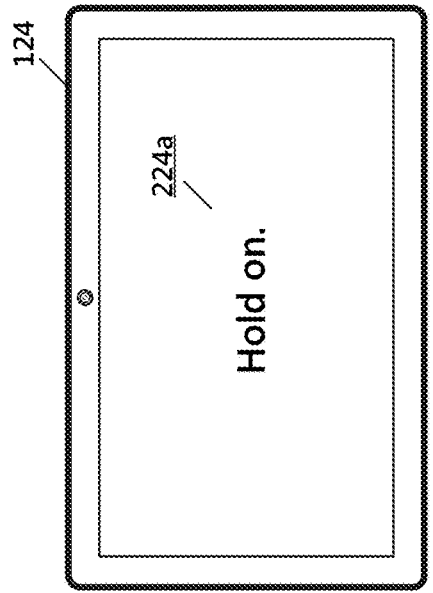
Figure 2H:
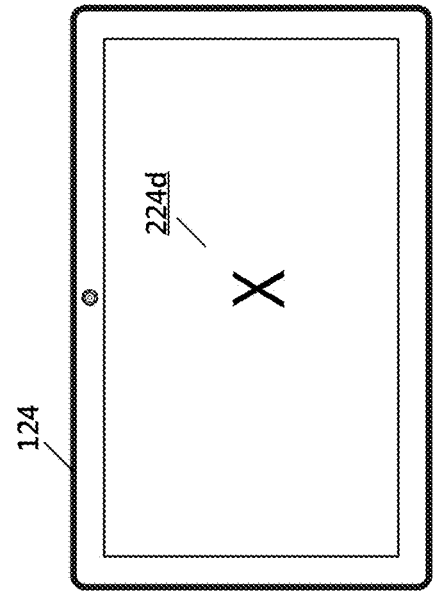

According to another example and with reference to FIG. 2H, a "hold on" ALM effect option 216 may be provided, which when selected may provide a visual effect/output 122 for display on a communication partner's visual output device 124. The visual effect may be embodied as one or more visual features representing the selected ALM effect option 216, such as text 220*a* saying "hold on," an animated dot object 220*b* indicating to wait or hold on, an icon or clipart 220*c* illustrating for the communication partner 120 to wait, an emoticon 220*d* portraying waiting or holding, an animated avatar 220*e*, or a video clip 220*f* that characterizes waiting for the user 104.

Figure 2I:
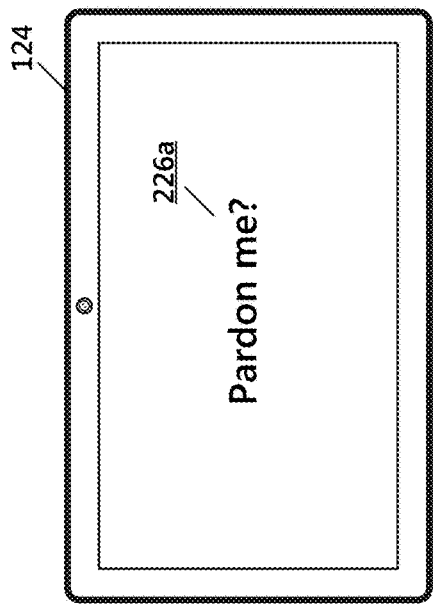
Figure 2I:
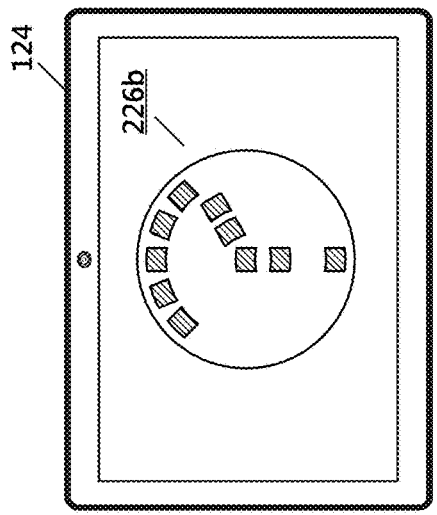
Figure 2I:
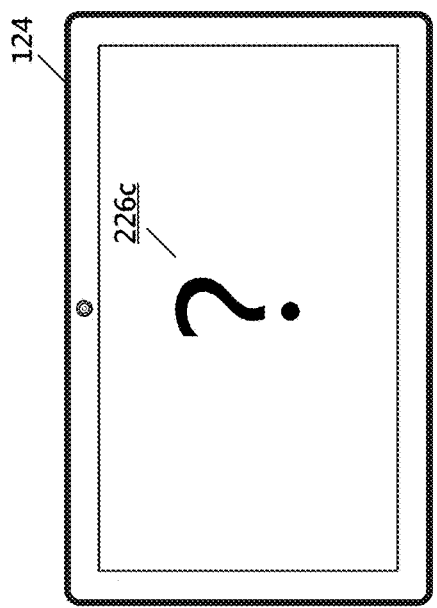
Figure 2I:
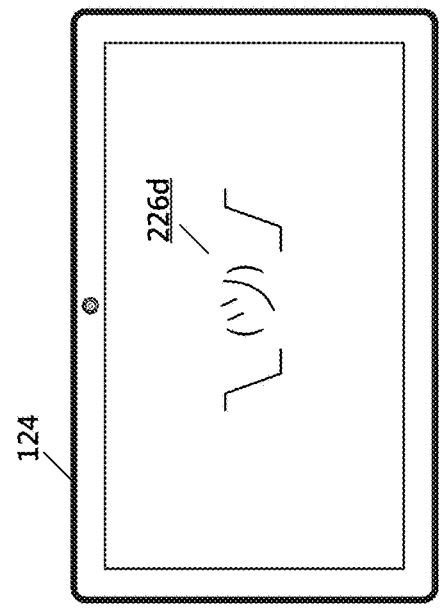
Figure 2I:
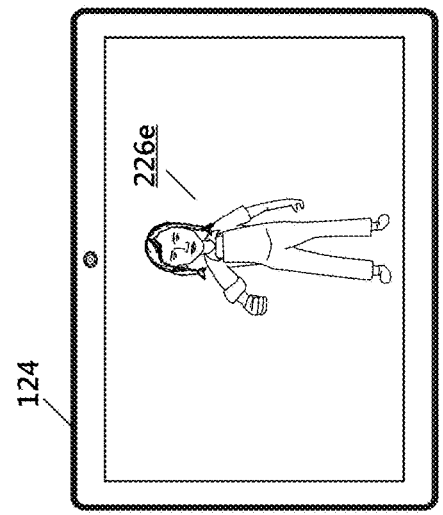
Figure 2I:
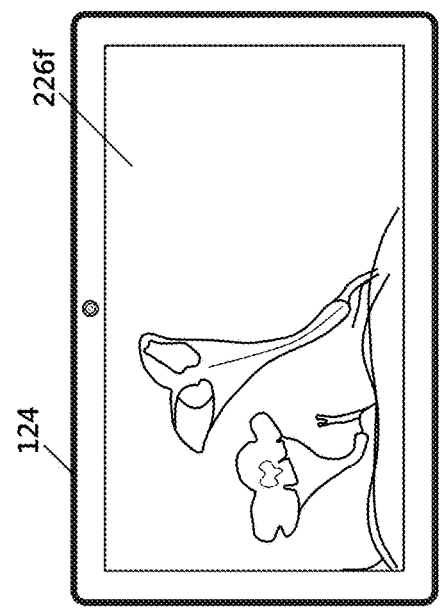

According to another example and with reference to FIG. 2I, a "pardon me?" ALM effect option 216 may be provided, which when selected may provide a visual effect/output 122 for display on a communication partner's visual output device 124. The visual effect may be embodied as one or more visual features representing the selected ALM effect option 216 such as text 220*a* saying "pardon me?," an animated dot object 220*b* indicating a question, an icon or clipart 220*c* illustrating a question, an emoticon 220*d* portraying a question, an animated avatar 220*e*, or a video clip 220*f* that characterizes questioning.

As should be appreciated, the examples described above and illustrated in FIGS. 2E-2I are not meant to limiting. Other ALM effect options 216 and other visual effects/output 122 are possible and are within the scope of the disclosure. For example, the visual output 122 can be in a spectrum from concrete to ambiguous, as well as the spectrum of low to high resolution. According to an aspect, visual output 122 may be generated and provided automatically. For example, when the expressive communication partner's system 108 may detect that the user 104 is typing, and automatically provide a visual effect, such one or more of the "I'm typing" visual features or the "I'm talking" visual features described above and illustrated in FIGS. 2F and 2G. Further, according to another aspect, the communication partner's visual output device 124 could be embodied as a physical object that is configured to convey the other visual effects/output 122. For example, the visual output device 124 may include an animatronic robot configured to move appendages, change positions and/or change facial expressions to reflect the visual output 122.

Figure 2J:
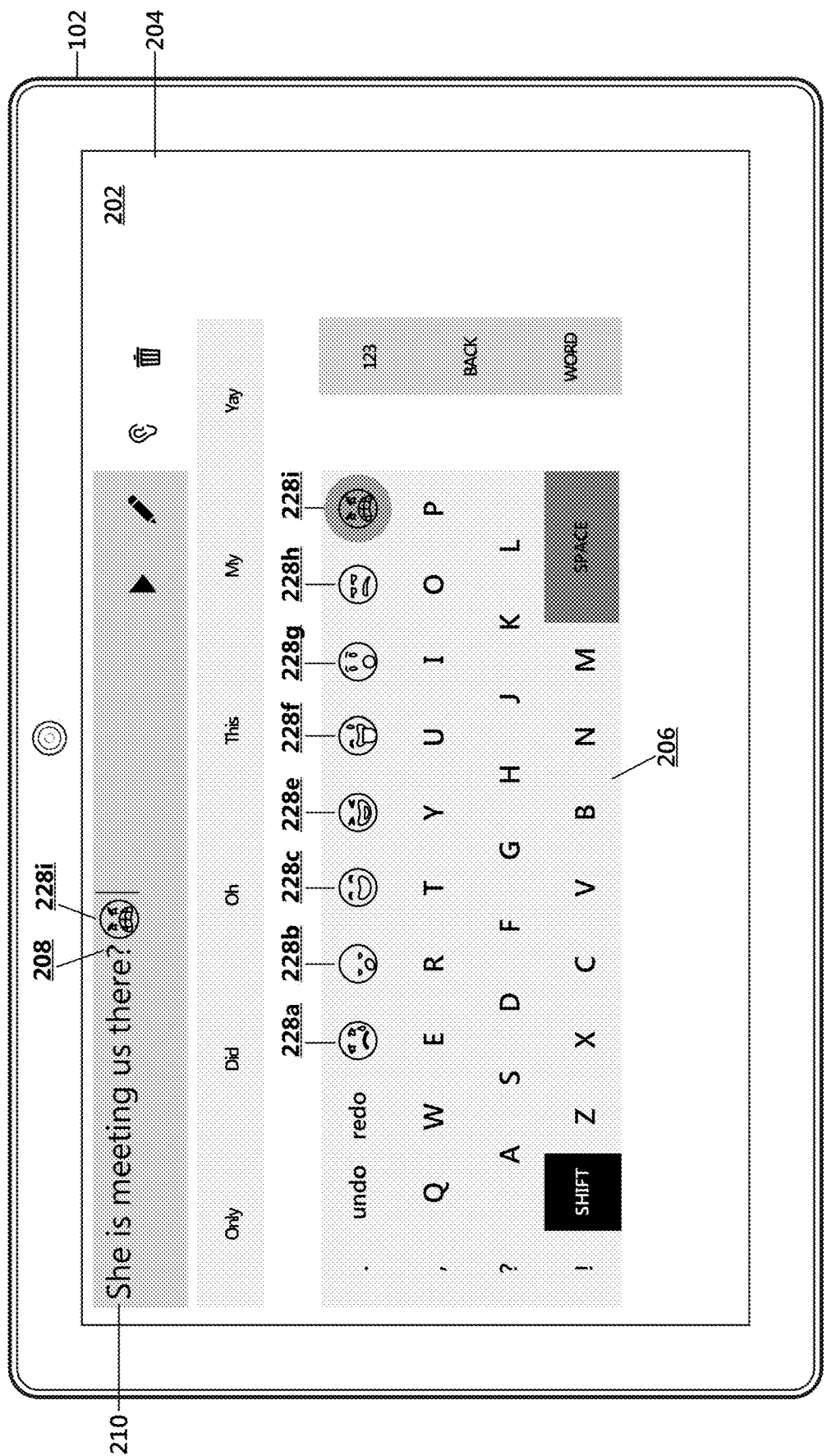
FIG. 2J is an illustration of an example user interface display generated by aspects of the expressive synthesized speech system showing various example selectable emoji objects.

As described above and with reference now to FIG. 2J, the expressive keyboard UI engine 110 is operative to provide a set of selectable icons or emoji objects 228*a-n* (collectively, 228) that can be selectively inserted into the user's text 210. According to an example, certain emoji objects 228 may be intelligently and selectively displayed, for example, based on linguistic properties of the user's textual input or based on recognized user affects detected via a sensor (e.g., biometric sensors, facial expression sensors, body posture sensors, gesture sensors). Each emoji object 228 illustrates a particular emotion (e.g., sad, calm, happy, funny, sarcastic, surprised, irritated, angry), and is associated with a predefined speech operation or operations that can add a sound effect (e.g., laughter, a sharp breath, a sarcastic scoff, grunt, sigh, a disgusted "ugh" sound, an angry "argh" sound), change the tone of voice of the user's text 210 to a specified emotional state (e.g., sad, calm, happy, funny, sarcastic, irritated, angry), or a combination of both. For example, specific predetermined prosodic attribute settings may be associated with each emoji object 228. When an emoji object 228 is inserted, the specific predetermined prosodic attribute settings associated with the particular emoji object are applied to the user's text 210. As illustrated in FIG. 2J, the user 104 has entered text 210 and has selected an angry emoji object 228*i*. Accordingly, responsive to the user's selection, the expressive communication partner's system 108 is operative to insert an angry "argh" sound effect and modify the user's text 210 according to predefined prosodic attribute settings associated with the angry emoji object 228*i* for expressing an angry tone when the text is played. Further, the user's text 210 includes a punctuation object 208, which in the illustrated example is a question mark. Accordingly, specific prosodic features may be applied to a portion of the user's text 210 according to the inserted punctuation object 208. For example, the pitch of the last one or more words may be raised to emphasize that the sentence is a question.

Figure 2K:
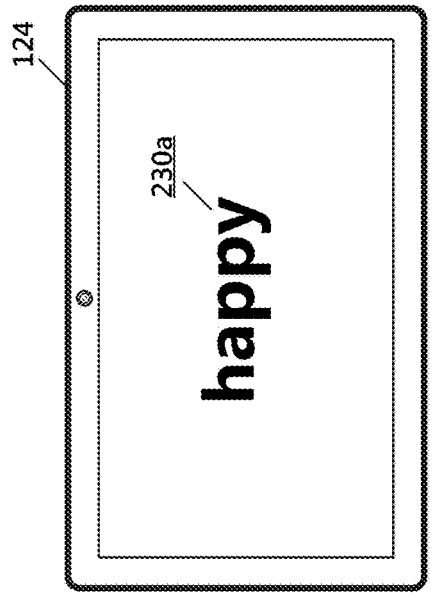
FIGS. 2K-2P are illustrations of example user interface displays generated by aspects of the expressive synthesized speech system showing examples of visual effects/output corresponding to various emoji objects.
Figure 2K:
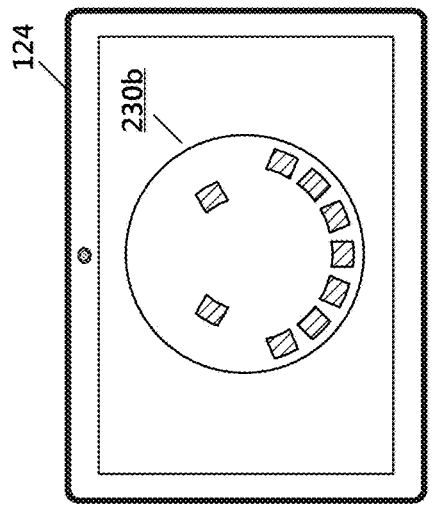
Figure 2K:
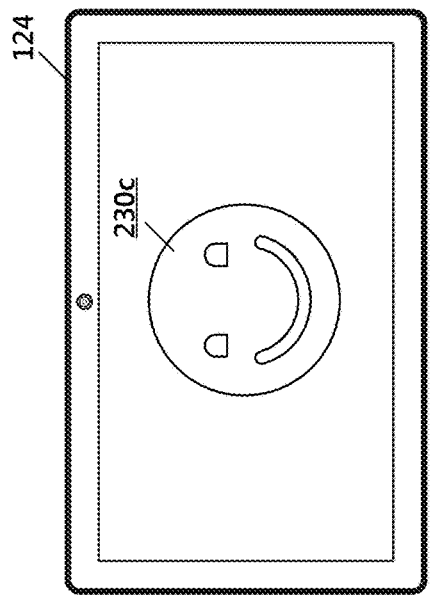
Figure 2K:
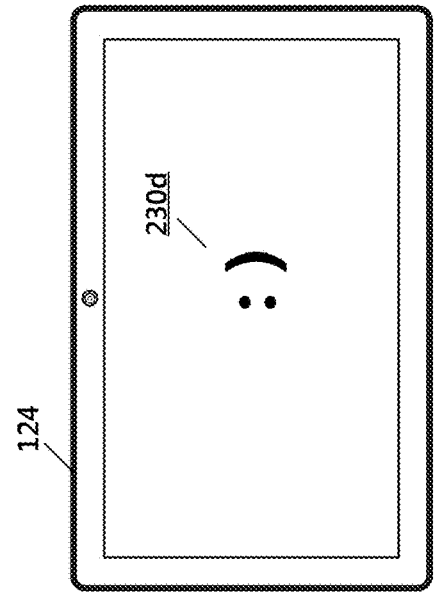
Figure 2K:
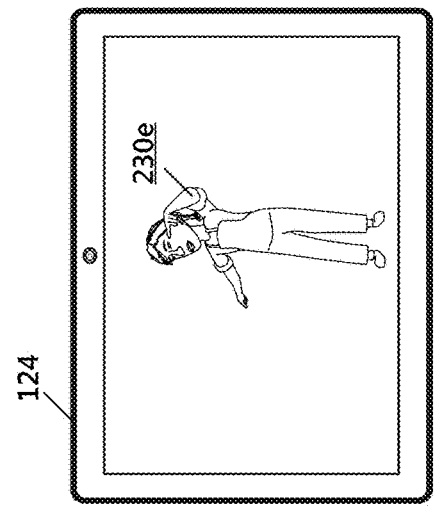
Figure 2K:
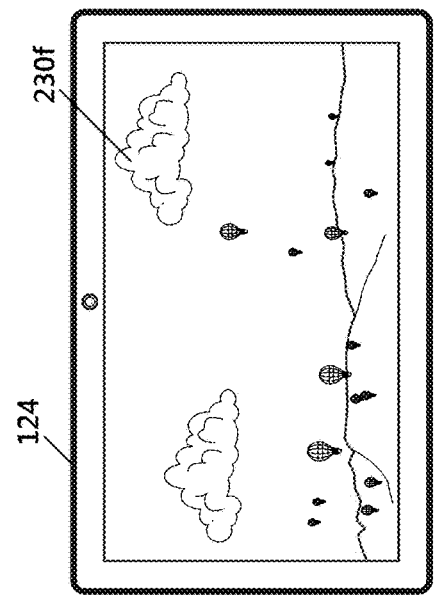

In some examples, emoji objects 228 are further associated with predefined visual operations, wherein selection and insertion of an emoji object 228 in the user's text 210 causes the expressive synthesized speech system 108 to provide a particular visual feature for display on the communication partner's device. Examples of various visual features that may be displayed in response to the user's selection of emoji objects 228 are illustrated in FIGS. 2K-2P. With reference now to FIG. 2K, responsive to a selection of a happy emoji object 228c, a visual effect/output 122 representing a happy expression may be provided for display on a communication partner's visual output device 124. The visual effect may be embodied as one or more visual features representing the selected emoji object 228, such as text 230a saying "happy," an animated dot object 230b characterizing a smiley face, an icon or clipart 230c illustrating a smiley face, an emoticon 230d portraying a smiley face, an animated avatar 230e personifying happiness, or a video clip 230f that characterizes happiness.

Figure 2L:
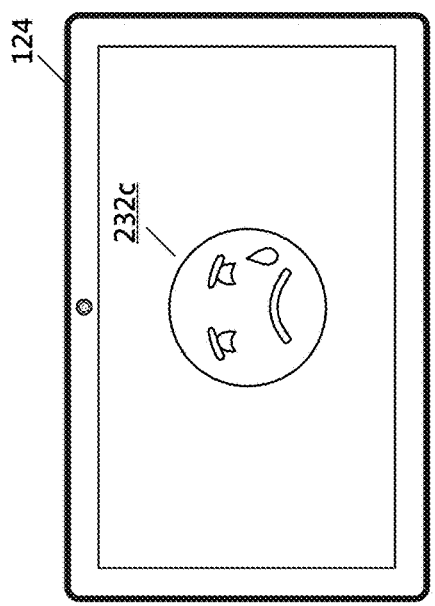
Figure 2L:
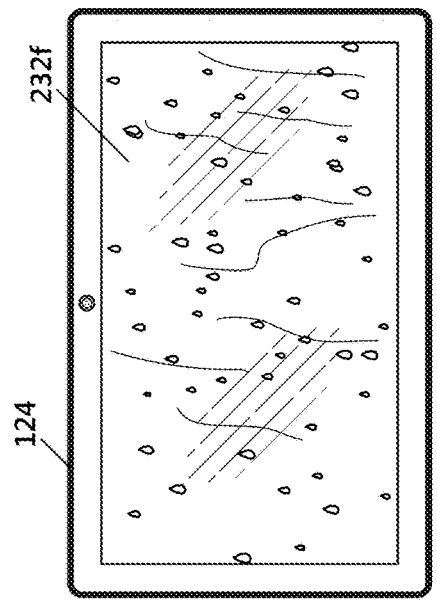
Figure 2L:
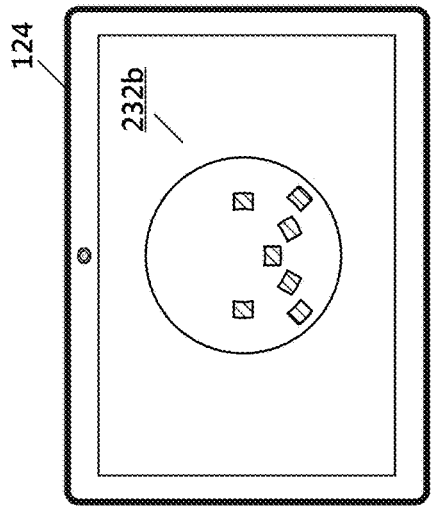
Figure 2L:
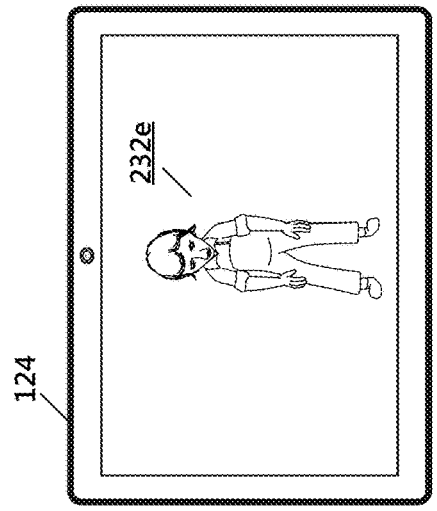
Figure 2L:
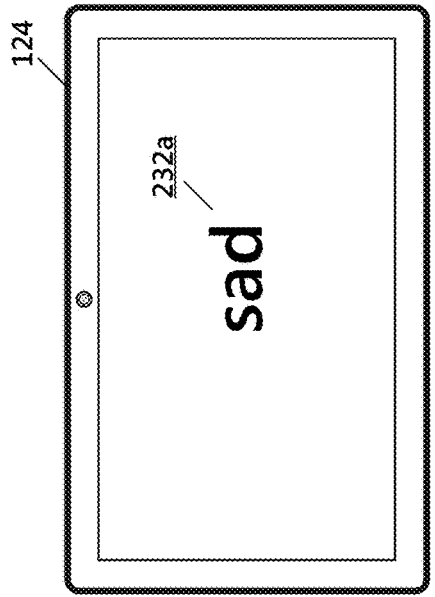
Figure 2L:
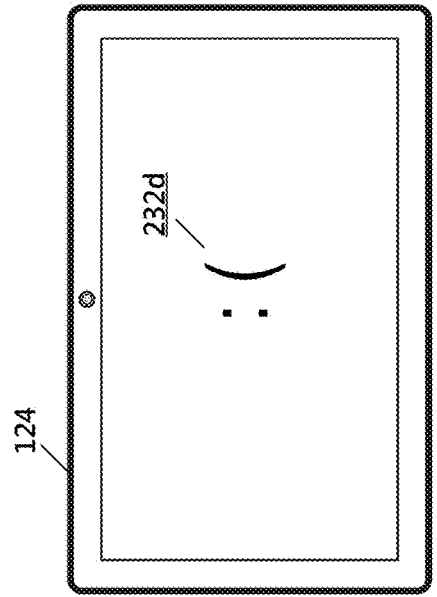

With reference now to FIG. 2L, responsive to a selection of a sad emoji object 228a, a visual effect/output 122 representing a sad expression may be provided for display on a communication partner's visual output device 124. The visual effect may be embodied as one or more visual features representing the selected emoji object 228, such as text 232a saying "sad," an animated dot object 232b characterizing a sad face, an icon or clipart 232c illustrating a sad face, an emoticon 232d portraying a sad face, an animated avatar 232e personifying sadness, or a video clip 232f that characterizes sadness.

Figure 2M:
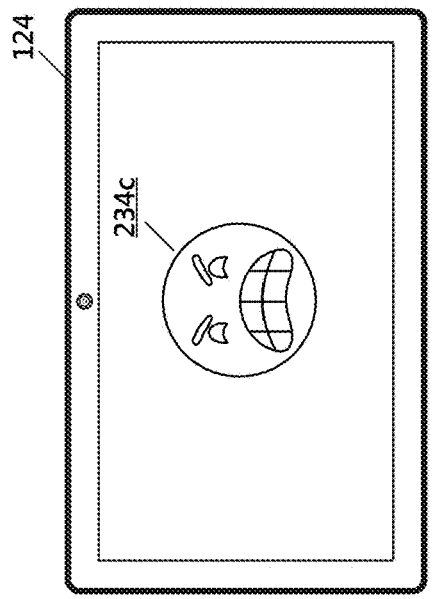
Figure 2M:
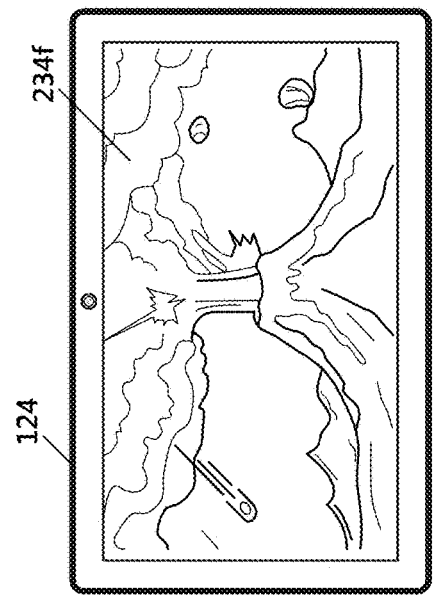
Figure 2M:
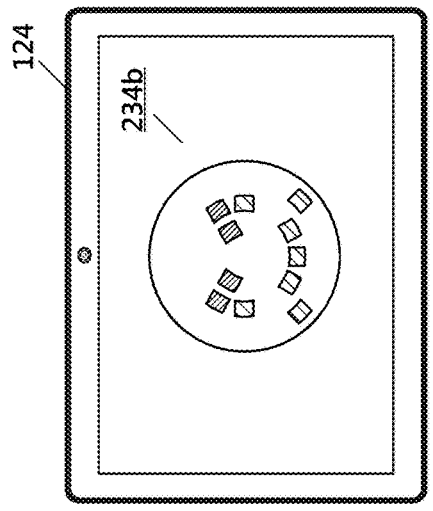
Figure 2M:
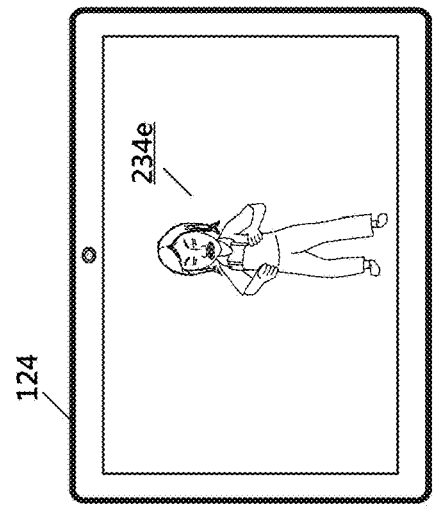
Figure 2M:
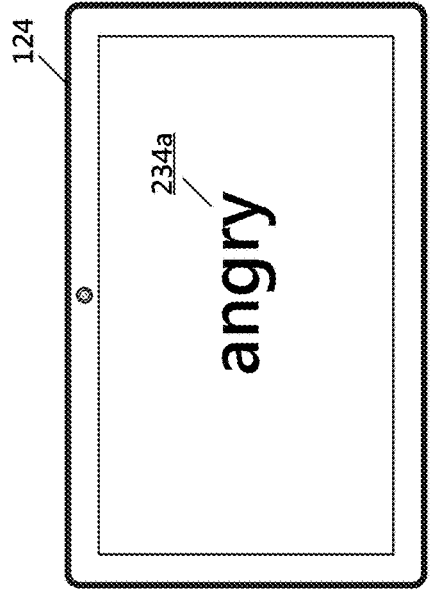
Figure 2M:
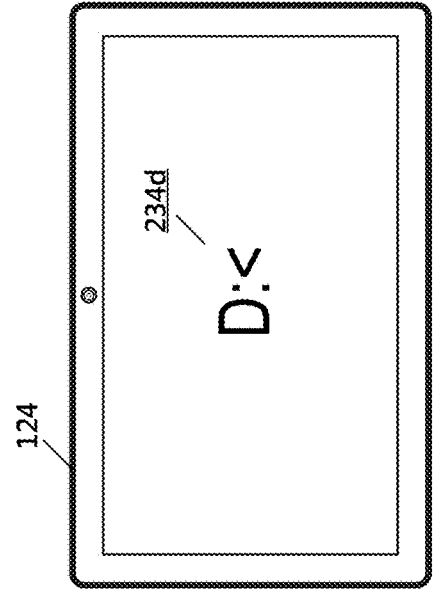

With reference now to FIG. 2M, responsive to a selection of an angry emoji object 228i, a visual effect/output 122 representing an angry expression may be provided for display on a communication partner's visual output device 124. The visual effect may be embodied as one or more visual features representing the selected emoji object 228, such as text 234a saying "angry," an animated dot object 234b characterizing an angry face, an icon or clipart 234c illustrating an angry face, an emoticon 234d portraying an angry face, an animated avatar 234e personifying anger, or a video clip 232f that characterizes anger.

Figure 2N:
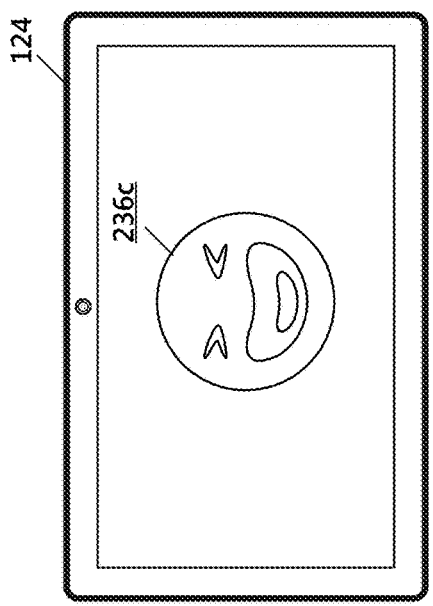
Figure 2N:
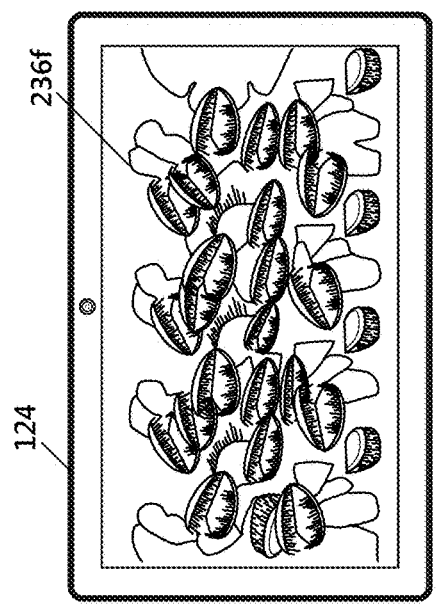
Figure 2N:
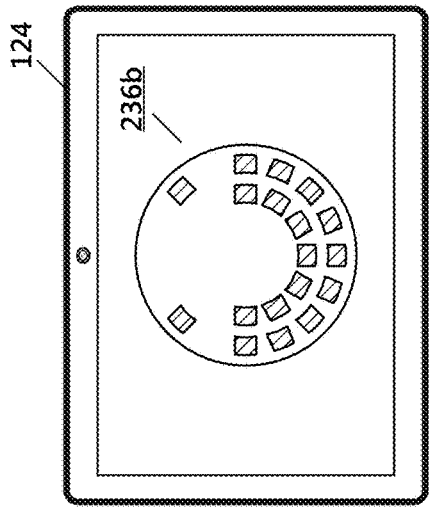
Figure 2N:
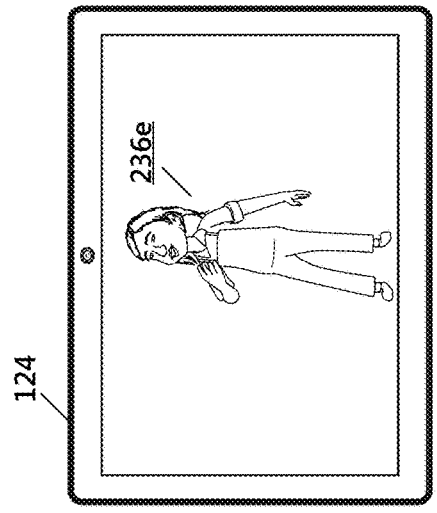
Figure 2N:
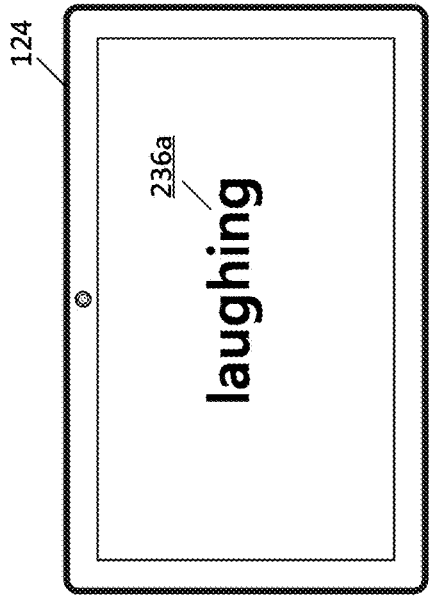
Figure 2N:
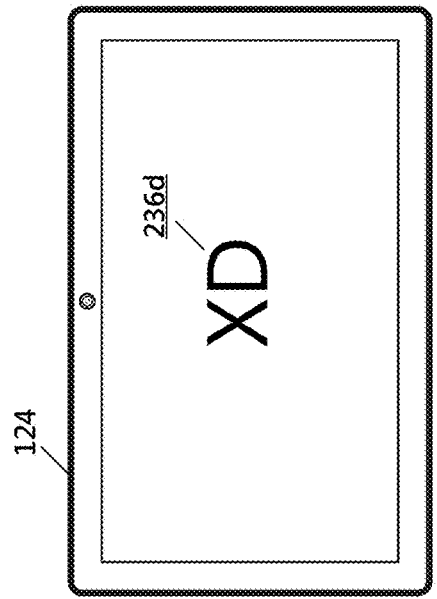

With reference now to FIG. 2N, responsive to a selection of a funny emoji object 228d, a visual effect/output 122 representing a funny expression may be provided for display on a communication partner's visual output device 124. The visual effect may be embodied as one or more visual features representing the selected emoji object 228, such as text 236a saying "funny," an animated dot object 236b characterizing a laughing face, an icon or clipart 236c illustrating a laughing face, an emoticon 236d portraying a laughing face, an animated avatar 236e personifying laughter, or a video clip 236f that characterizes laughter.

Figure 2O:
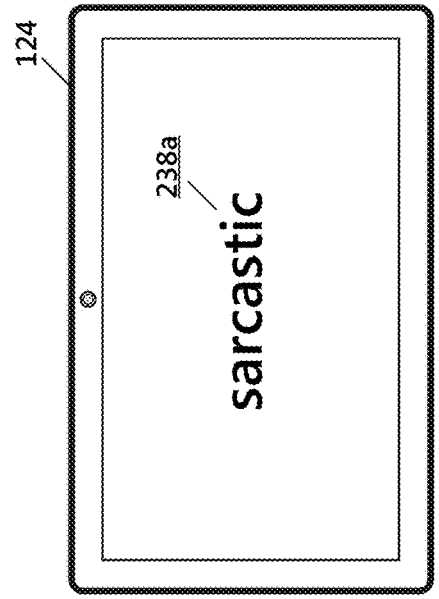
Figure 2O:
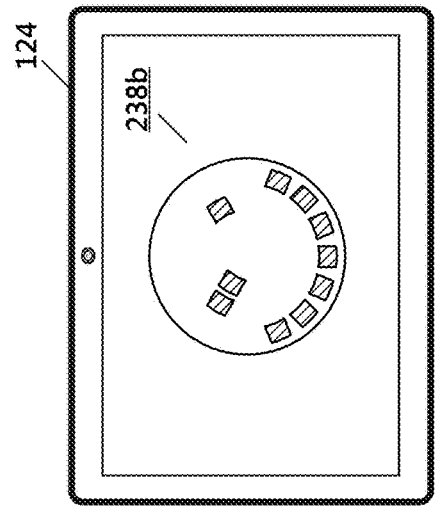
Figure 2O:
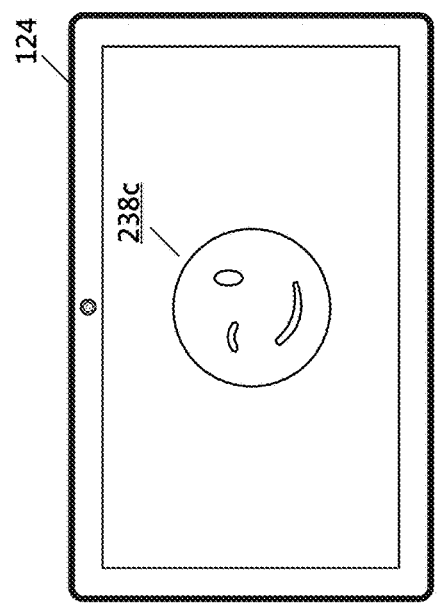
Figure 2O:
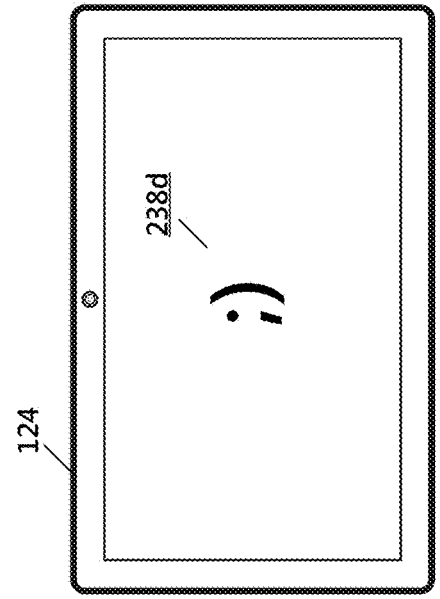
Figure 2O:
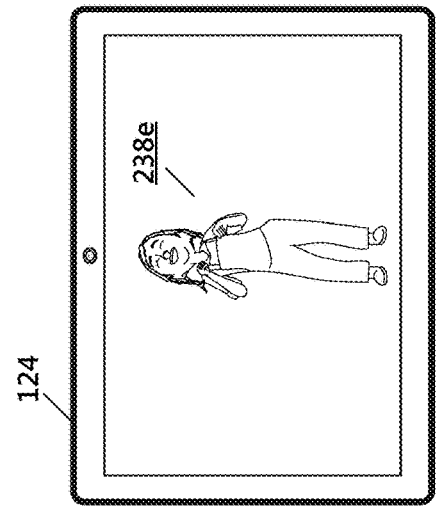
Figure 2O:
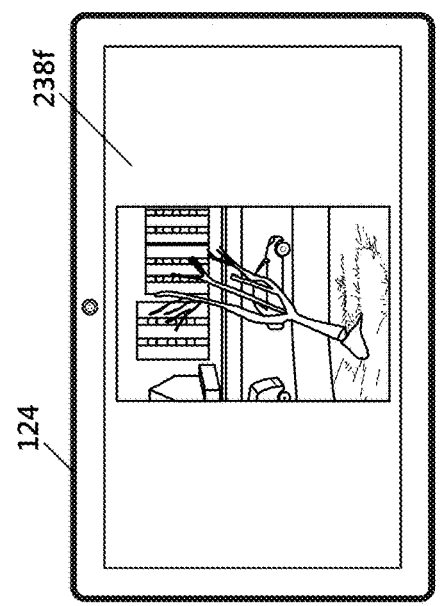

With reference now to FIG. 2O, responsive to a selection of a sarcastic emoji object 228e, a visual effect/output 122 representing a sarcastic expression may be provided for display on a communication partner's visual output device 124. The visual effect may be embodied as one or more visual features representing the selected emoji object 228, such as text 238a saying "sarcastic," an animated dot object 238b characterizing a sarcastic face, an icon or clipart 238c illustrating a sarcastic face, an emoticon 238d portraying a sarcastic face, an animated avatar 238e personifying sarcasm, or a video clip 238f that characterizes sarcasm.

Figure 2P:
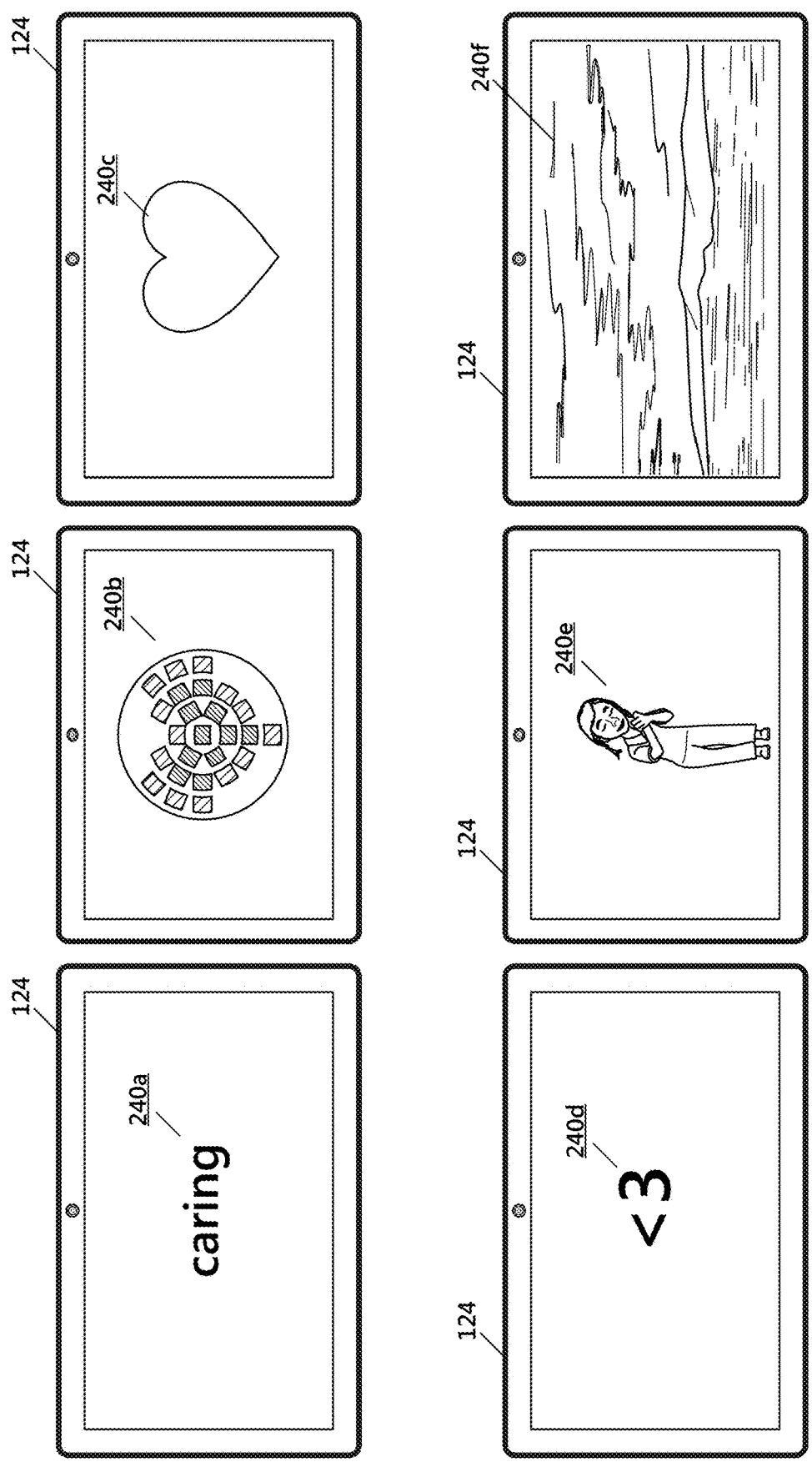

With reference now to FIG. 2P, responsive to a selection of a love emoji object 228, a visual effect/output 122 representing a loving expression may be provided for display on a communication partner's visual output device 124. The visual effect may be embodied as one or more visual features representing the selected emoji object 228, such as text 240a saying "caring," an animated dot object 240b characterizing a heart, an icon or clipart 240c illustrating a heart, an emoticon 240d portraying a heart, an animated avatar 240e personifying love, or a video clip 240f that characterizes love. As should be appreciated, the above examples are not limiting. Other emoji objects 228 and visual features are possible and are within the scope of the present disclosure.

Figure 3A:
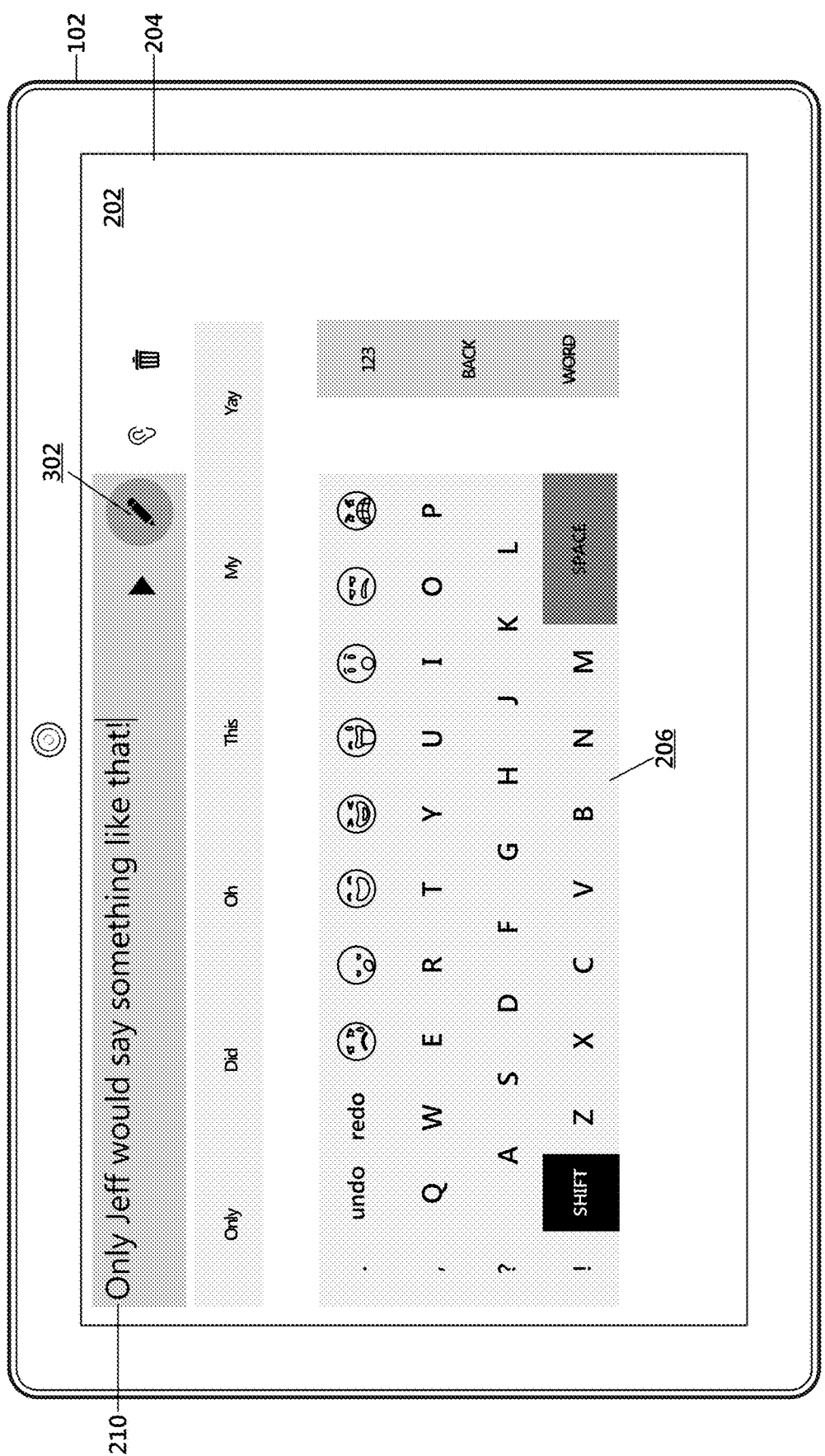
FIG. 3A is an illustration of an example user interface display generated by aspects of the expressive synthesized speech system showing a selection to utilize the voicesetting editor.

As described above, the voicesetting editor 112 is operative to provide a GUI that allows the user 104 to modify various prosodic properties associated with individual words within input text 210 for explicitly authoring expressivity of synthesized speech. With reference now to FIG. 3A, the user 104 is enabled to select to use the voicesetting editor 112, for example, via a selection of a voicesetting editor command 302.

Figure 3B:
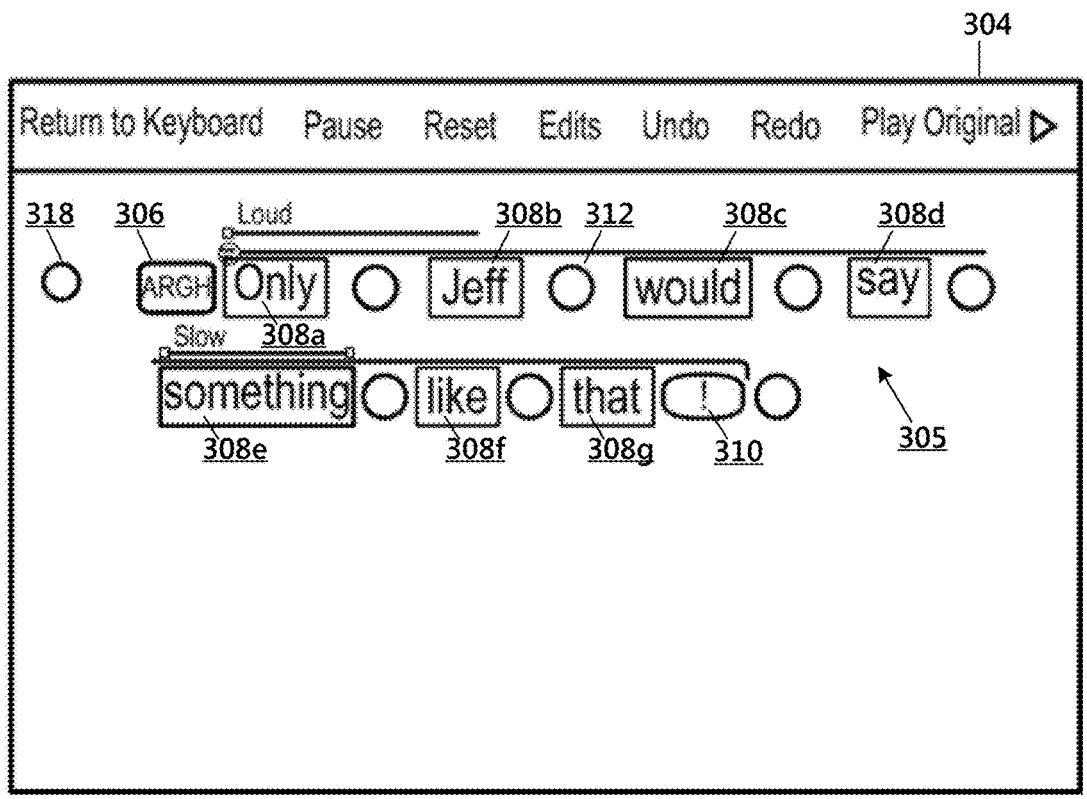
FIGS. 3B-3G are illustrations of example voicesetting editor user interface displays generated by aspects of the expressive synthesized speech system.

In response and with reference now to FIG. 3B, the voicesetting editor 112 is operative to display a voicesetting editor UI 304 for enabling the user 104 to author specific prosodic properties of the textual input 210. According to an aspect, the voicesetting editor 112 is operative to parse the input text 210 into three types of tokens 305: words 308, punctuation 310, and vocal sound effects 306 (e.g., derived from selected emoji objects 228 in the input text 210). As illustrated in FIG. 3B, the tokens 305 are displayed in reading order. According to an aspect, padding 312 is provided between the tokens for allowing sufficiently large gaze targets for gaze-based input. In some examples, sound effect tokens 306 include a textual description of the vocal sound effect they represent (e.g., "laugh" for laughter, "argh" for angry effect). According to aspects, the voicesetting editor 112 allows for setting prosodic properties 314 on individual tokens 305 or over ranges of tokens.

Figure 3C:
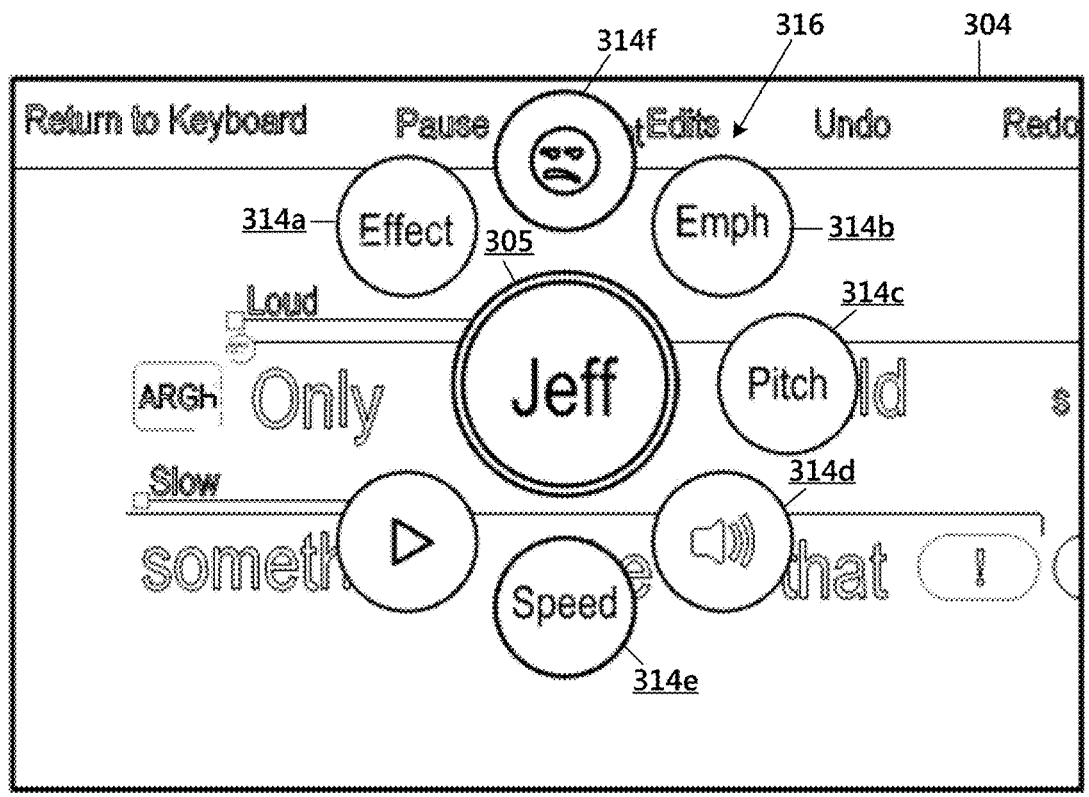
Figure 3D:
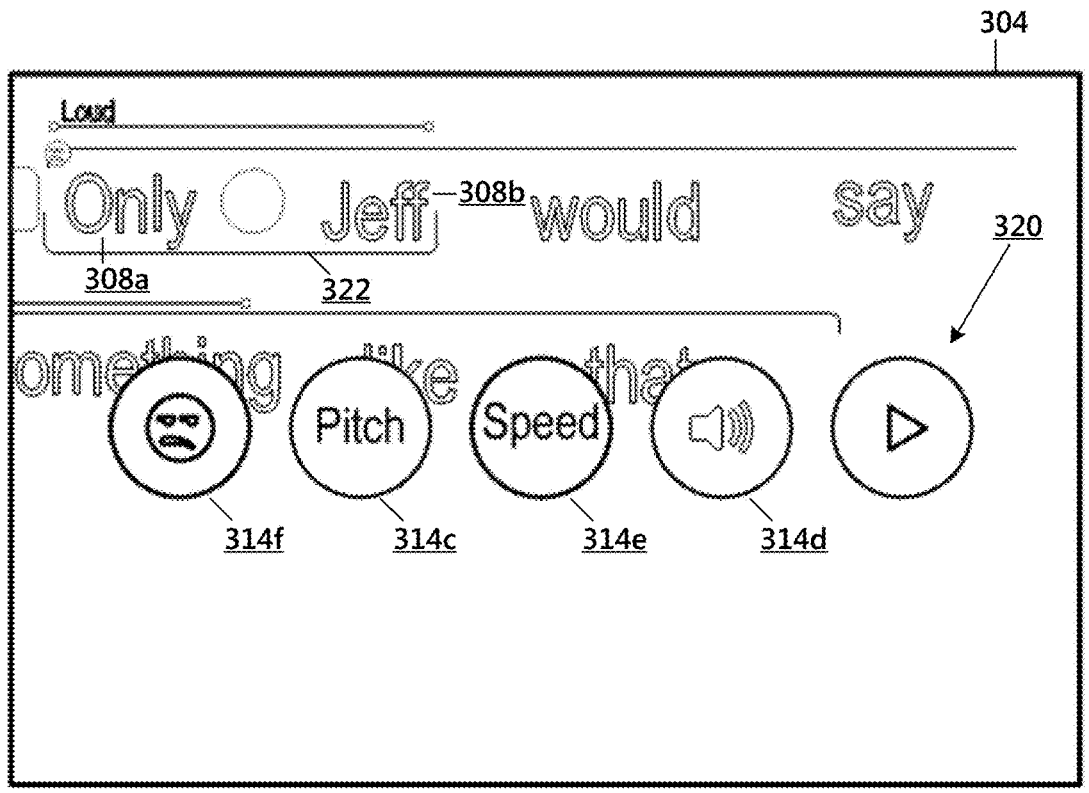

Selection of a single token, for example, by dwell-clicking on a specific token 305, opens a token editing interface, such as the example token editing interface 316 illustrated in FIG. 3C, for editing prosodic properties 314 associated with a single token. The token editing interface 316 includes the selected token 305 displayed in the center of the interface, wherein modifiable prosodic properties 314 are displayed in a radial menu surrounding the token. According to an aspect, a radial menu design used for single token editing reduces the amount of distance the user's eye must travel during gaze-based input to change properties 314 of the token, thus enabling efficient user interaction and increasing user interaction performance.

Aspects of the voicesetting editor UI 304 allow for selecting a range of tokens 305 for editing. In one example and as illustrated in FIG. 3B, a range selector 318 is provided, which when selected, allows the user 104 to select a range of tokens 305. For example, after selecting the range selector 318, the user 104 may select the first token 305 in the desired range, followed by a selection of the last token in the desired range. Responsive to selecting a range of tokens 305, the voicesetting editor 112 is operative to display a token editing interface, such as the example token editing interface 320 illustrated in FIG. 3D, for editing prosodic properties 314 associated with a range 322 of tokens 305.

According to examples, in the token editing interface 316,320, a set of prosodic properties 314 are displayed that the user 104 is enabled to adjust. According to an aspect, only the properties 314 that can be adjusted for a selected token 305 are displayed. Some prosodic properties 314 can be applied to all three types of token 305, for example, emotional tone, rate of speech, volume, and pitch. Other prosodic properties 314 are adjustable for particular token types. For example, word tokens 308 have an emphasis property 314b that allows the user 104 to specify which words should be emphasized. As another example, punctuation tokens 310 have a pause property 314 that allows the user 104 to specify an amount of silent time to synthesize between the pronunciations of words.

Figure 3E:
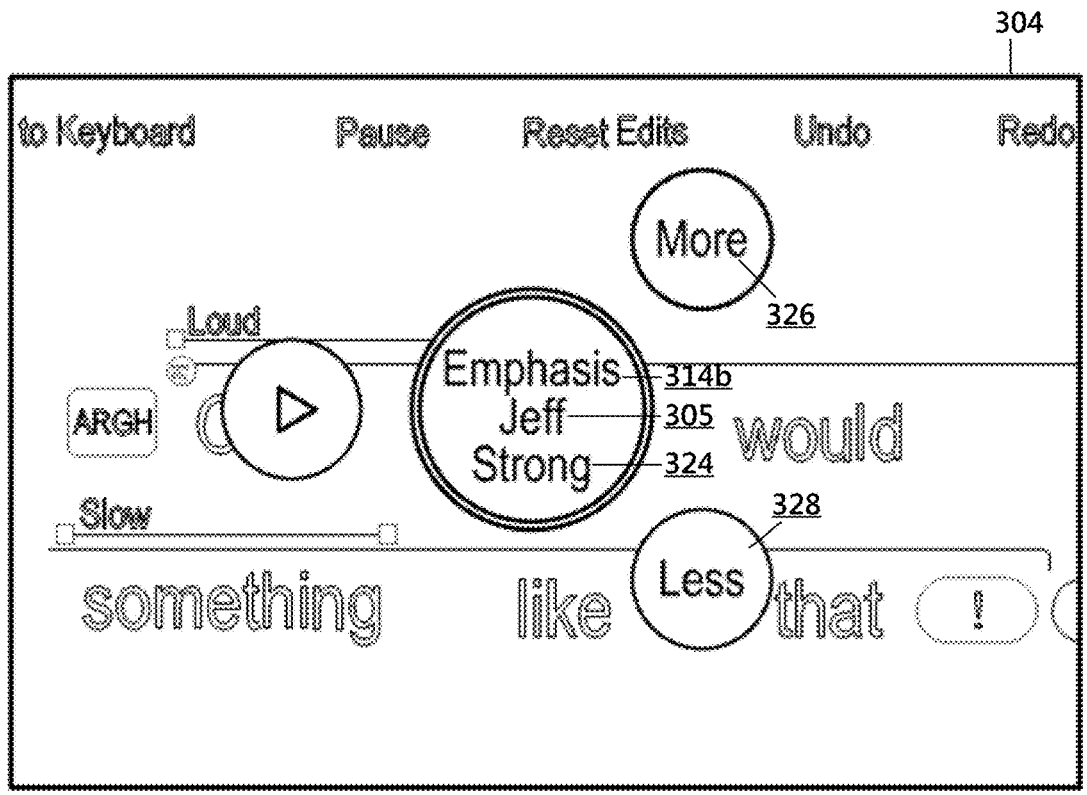

Upon selection of a prosodic property 314, the voicesetting editor 112 provides functionalities for enabling the user 104 to adjust the value of the property. According to an aspect, a set of predetermined value ranges are provided for prosodic properties 314. In an example and as illustrated in FIG. 3E, a meaningful label 324 is associated with each value. For example, the emphasis property 314b may have the labels 324 and values: "normal" (a default value that the user 104 is enabled to configure), "strong" (80%), and "very strong" (100%). Value adjusters 326,328 are provided for enabling the user 104 to adjust the value of the prosodic property up or down respectively.

Figure 3F:
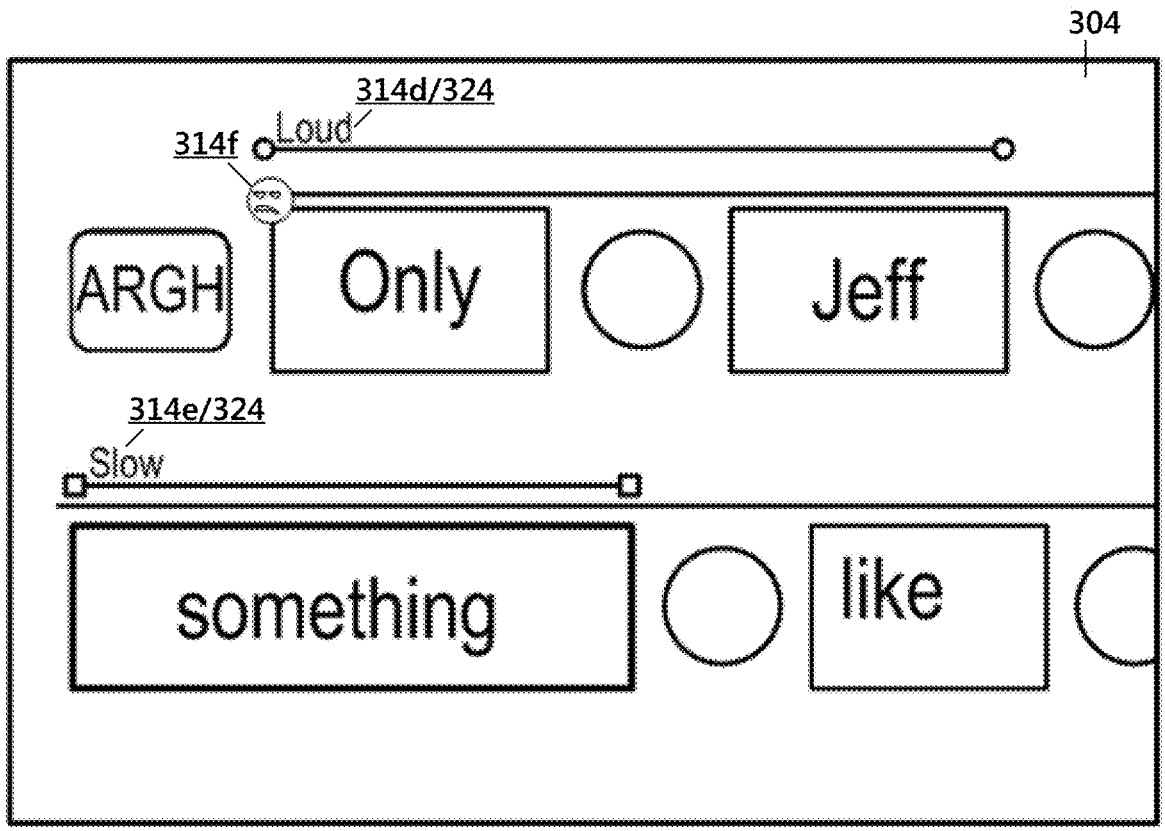
Figure 3G:
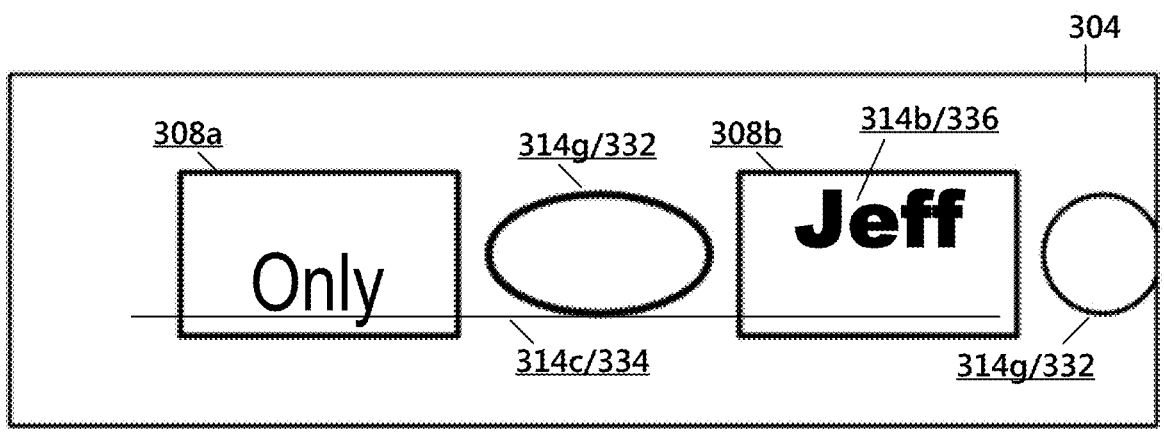

With reference to FIGS. 3F and 3G, prosodic property values are displayed in the voicesetting editor UI 304 using visual properties. In one example, emotional tone 314f, volume 314d, and rate of speech 314e properties are displayed as lines over tokens 305. According to an example, the labels 324 associated with the properties are displayed on or near the lines. According to another example, voice pitch 314c is displayed using a corresponding baseline height 334 (e.g., the higher the baseline height, the higher the pitch, the lower the baseline height, the lower the pitch). According to another example, emphasis 314b is displayed using font boldness 336 (e.g., bolder font corresponds to heavier emphasis). According to another example, pause length 314g is displayed using an ellipse 332, wherein the width of the ellipse 332 corresponds to the pause length according to inter-word or punctuation tokens.

Figure 4A:
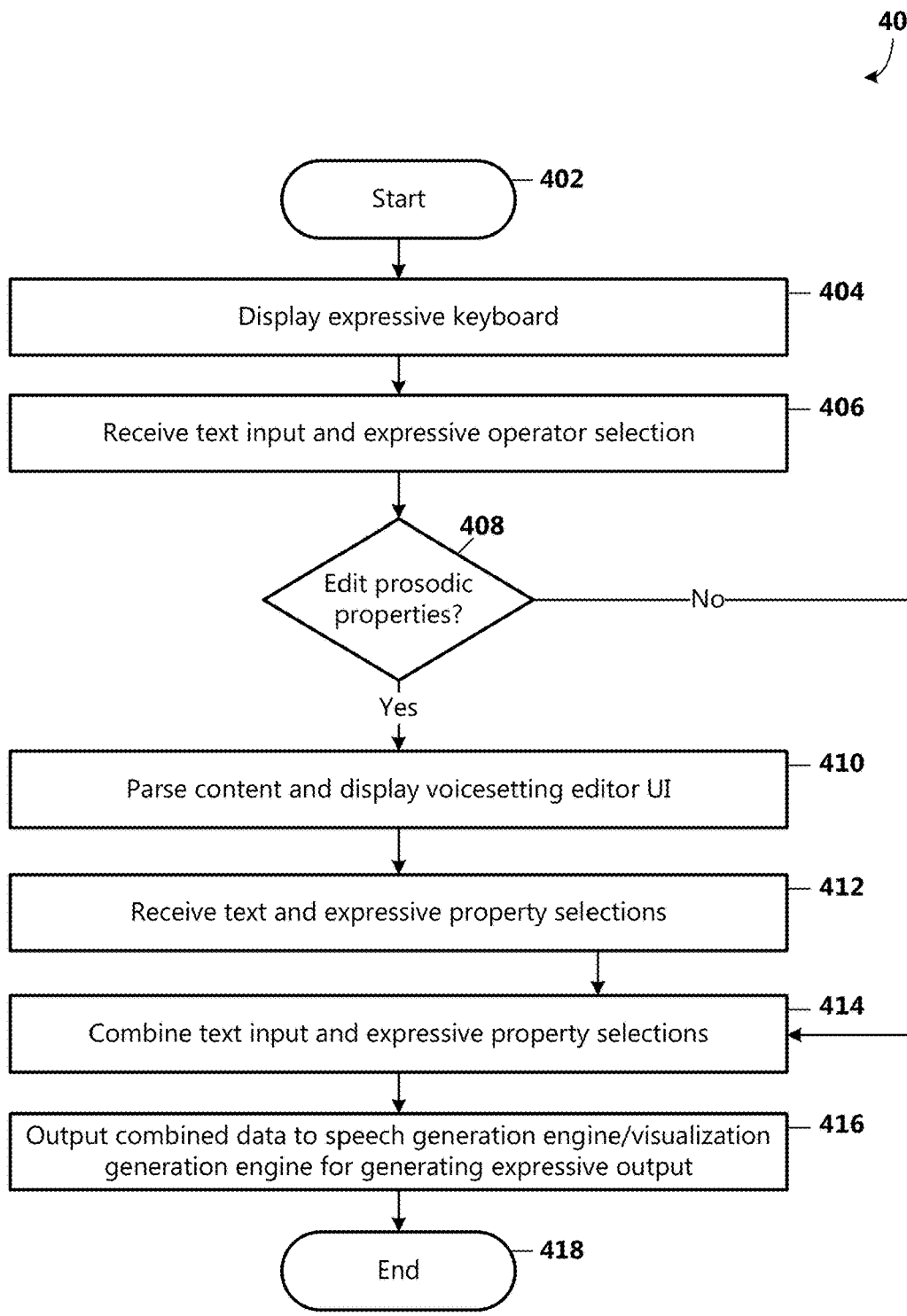
FIG. 4A is a flow chart showing general stages involved in an example method for generating expressive content.

Having described an operating environment and various user interface display examples with respect to FIGS. 1-3G, FIGS. 4A and 4B are flow charts showing general stages involved in example methods 400, 420 for generating expressive content. With reference now to FIG. 4A, the method 400 begins at start OPERATION 402, and proceeds to OPERATION 404, where the expressive keyboard 206 is displayed in the expressive synthesized speech system UI 202.

The method 400 proceeds to OPERATION 406, where textual input 210 is received from the user 104. Further, a selection of an expressive operator may be received. For example, the user 104 may select an emoji object 228 or a punctuation object 208 for insertion into the textual input.

At DECISION OPERATION 408, a determination is made as to whether to launch the voicesetting editor 112 for editing prosodic properties 314 associated with the user's textual content 210. For example, the determination may be made based on whether the user 104 selects a voicesetting editor command 302. When a determination is made to launch the voicesetting editor 112, the method 400 proceeds to OPERATION 410, where the voicesetting editor 112 parses the textual content 210 and any selected punctuation objects 208 or emoji objects 228, and displays a voicesetting editor UI 304 for allowing the user 104 to adjust or refine prosodic properties 314 for crafting the rendering of the user's content by a synthetic voice.

The method 400 proceeds to OPERATION 412, where the user 104 makes one or more prosodic property 314 selections, and at OPERATION 414, the prosodic attributes, vocal sound effects, or visual effects associated with selected emoji object 228 and/or punctuation object 208 are applied to the textual input 210.

At OPERATION 416, the combined textual input 210 and prosodic attributes, vocal sound effects, or visual effects are output to a speech generation engine 118 for generating expressive audible output 126 for playback on an audio output device 128 or to a visualization generation engine 116 for generating expressive visual output 122 for display on a visual output device 124. The method 400 ends at OPERATION 418.

Figure 4B:
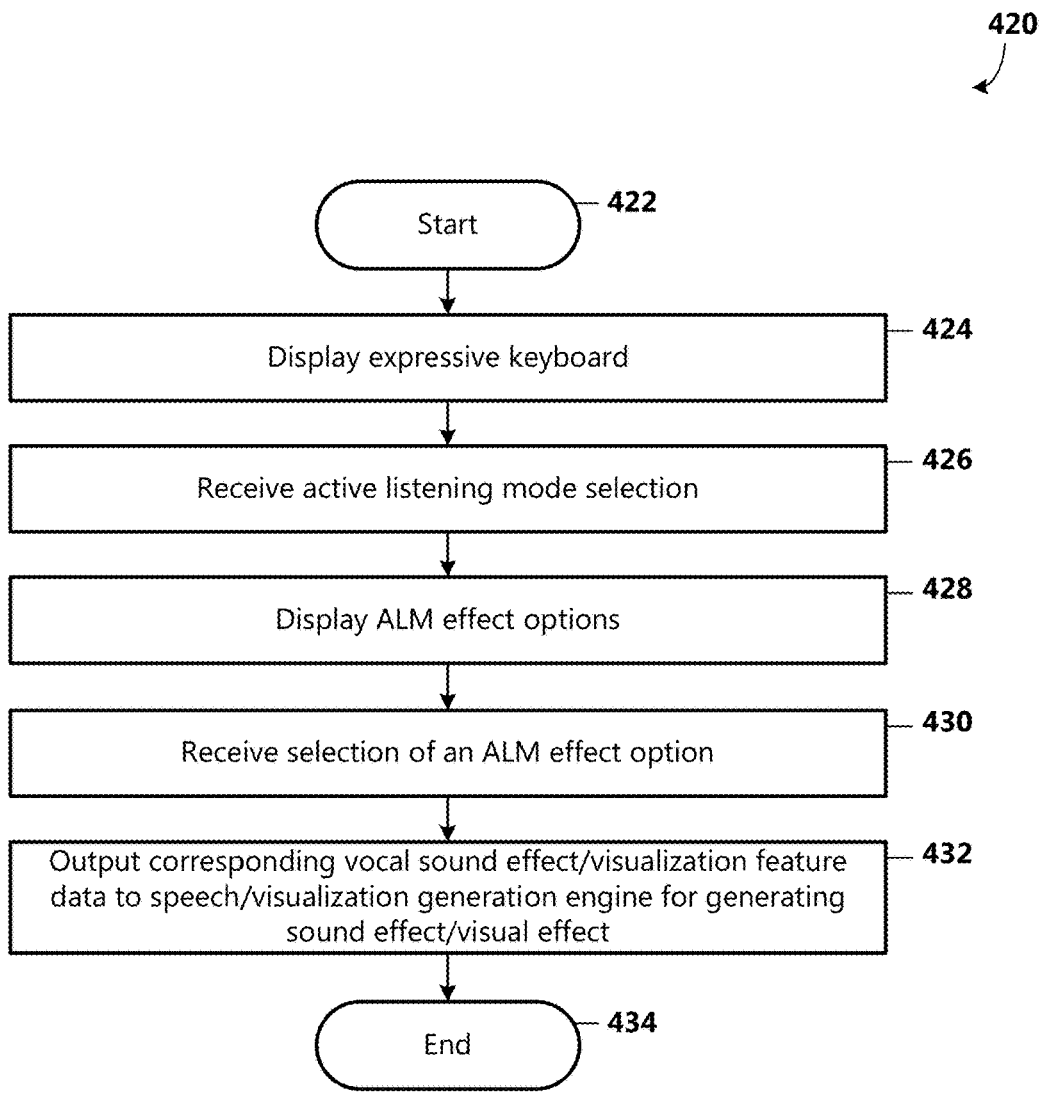
FIG. 4B is a flow chart showing general stages involved in another example method for generating expressive content.

With reference now to FIG. 4B, the method 420 begins at start OPERATION 422, and proceeds to OPERATION 424, where the expressive keyboard 206 is displayed in the expressive synthesized speech system UI 202.

The method 420 proceeds to OPERATION 426, where a selection to launch the active listening mode (ALM) is received. For example, the user 104 may select an ALM command 214 displayed on the expressive keyboard 206.

The method 420 proceeds to OPERATION 428, where responsive to the ALM command 214 selection, the expressive synthesized speech system 108 enters an active listening mode and the expressive keyboard UI engine 110 displays a plurality of selectable ALM effect options 216, wherein each ALM effect option 216 is associated with a particular sound effect and/or visual effect that can be selectively communicated to a communication partner 120.

The method 420 proceeds to OPERATION 430, where a selection of an ALM effect option 216 is received. At OPERATION 432, the expressive synthesized speech system 108 identifies the vocal sound effect and/or visual effect corresponding to the selected ALM effect option 216, and outputs the corresponding vocal sound effect and/or visual effect to a speech generation engine 118 or visualization generation engine 116 for generating audible output 126/ visual output 122 for playback/display on a communication partner's 120 device 128/124. The method 420 ends at OPERATION 434.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
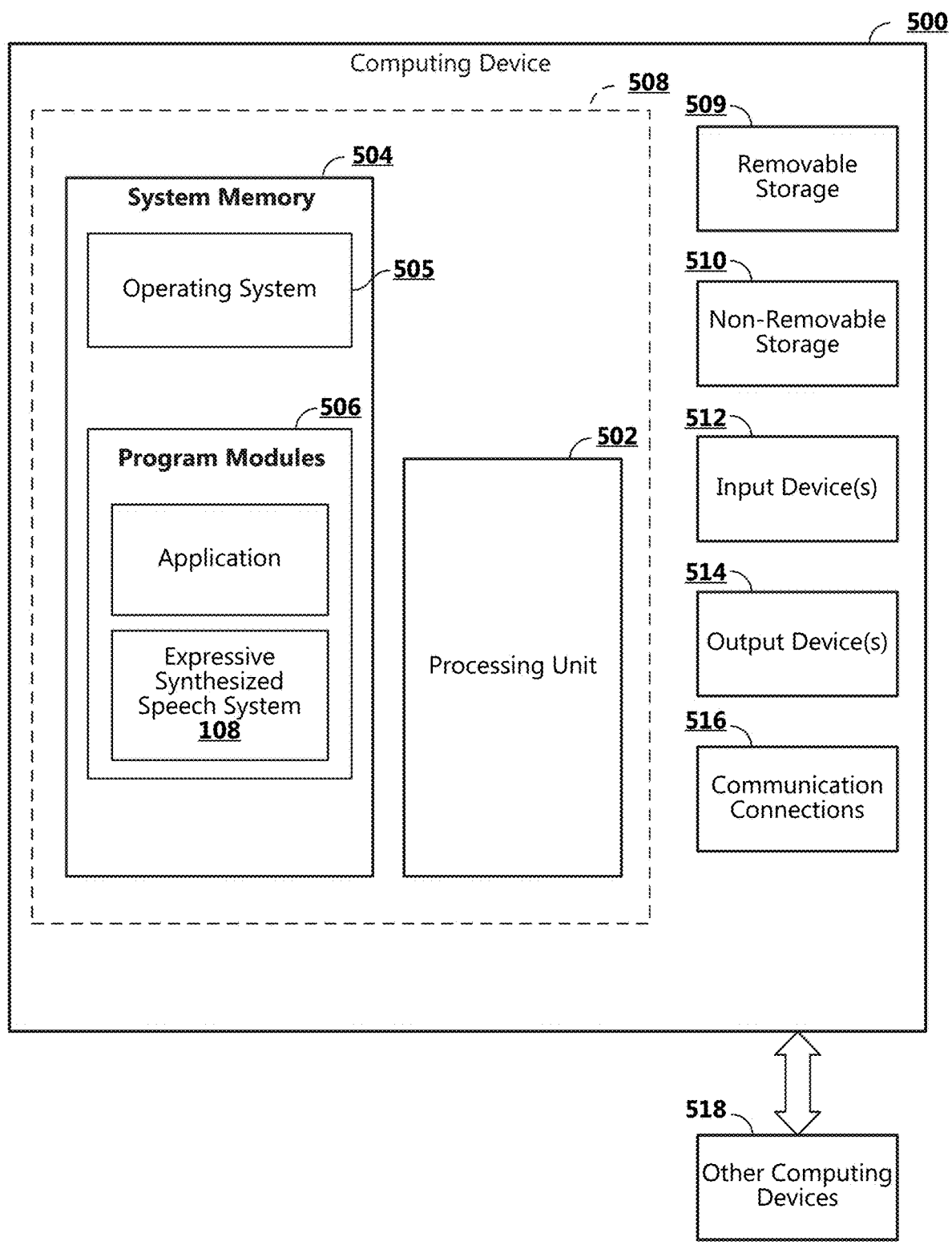
FIG. 5 is a block diagram illustrating example physical components of a computing device.
Figure 6A:
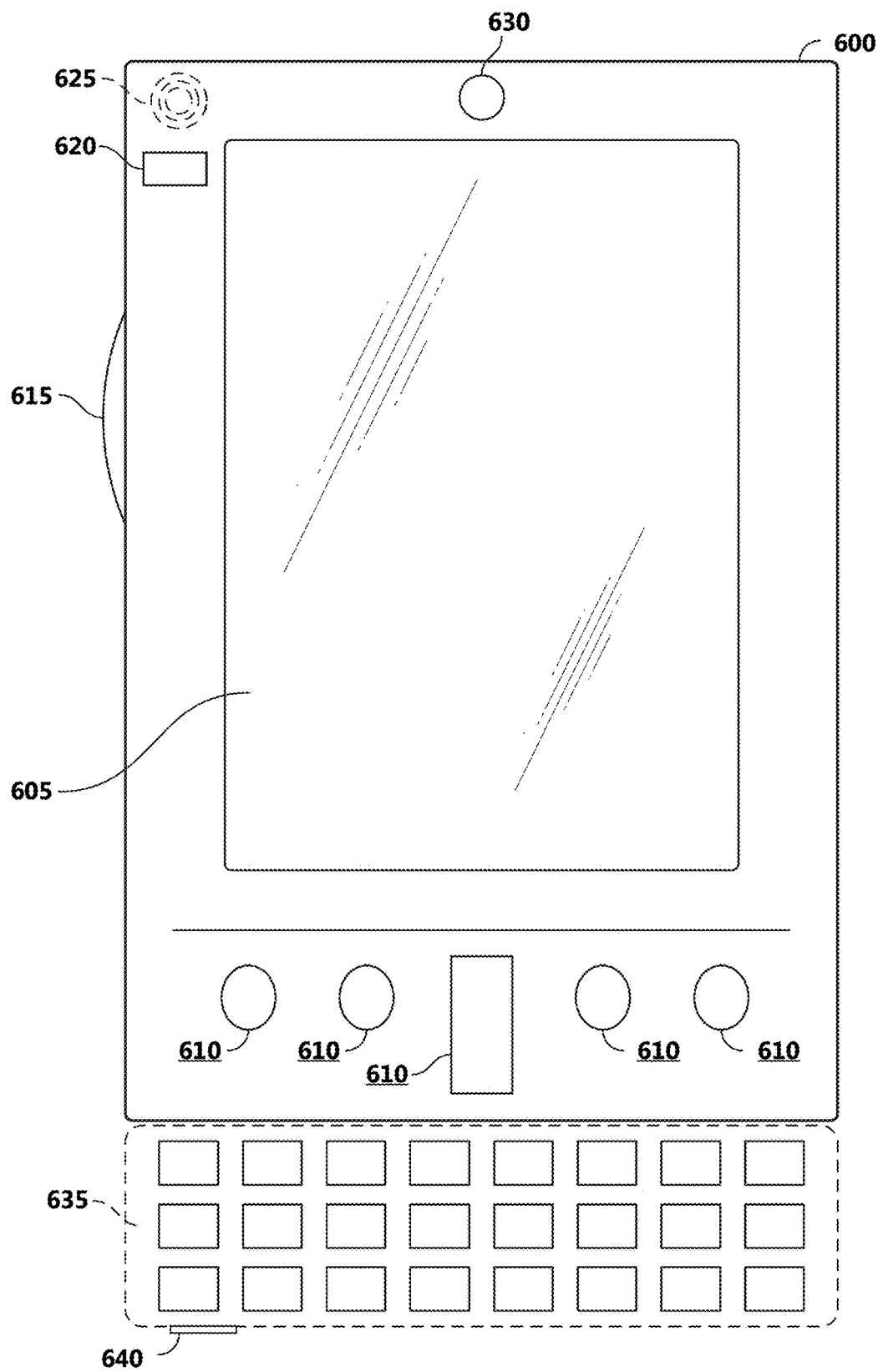
FIGS. 6A and 6B are block diagrams of a mobile computing device.
Figure 6B:
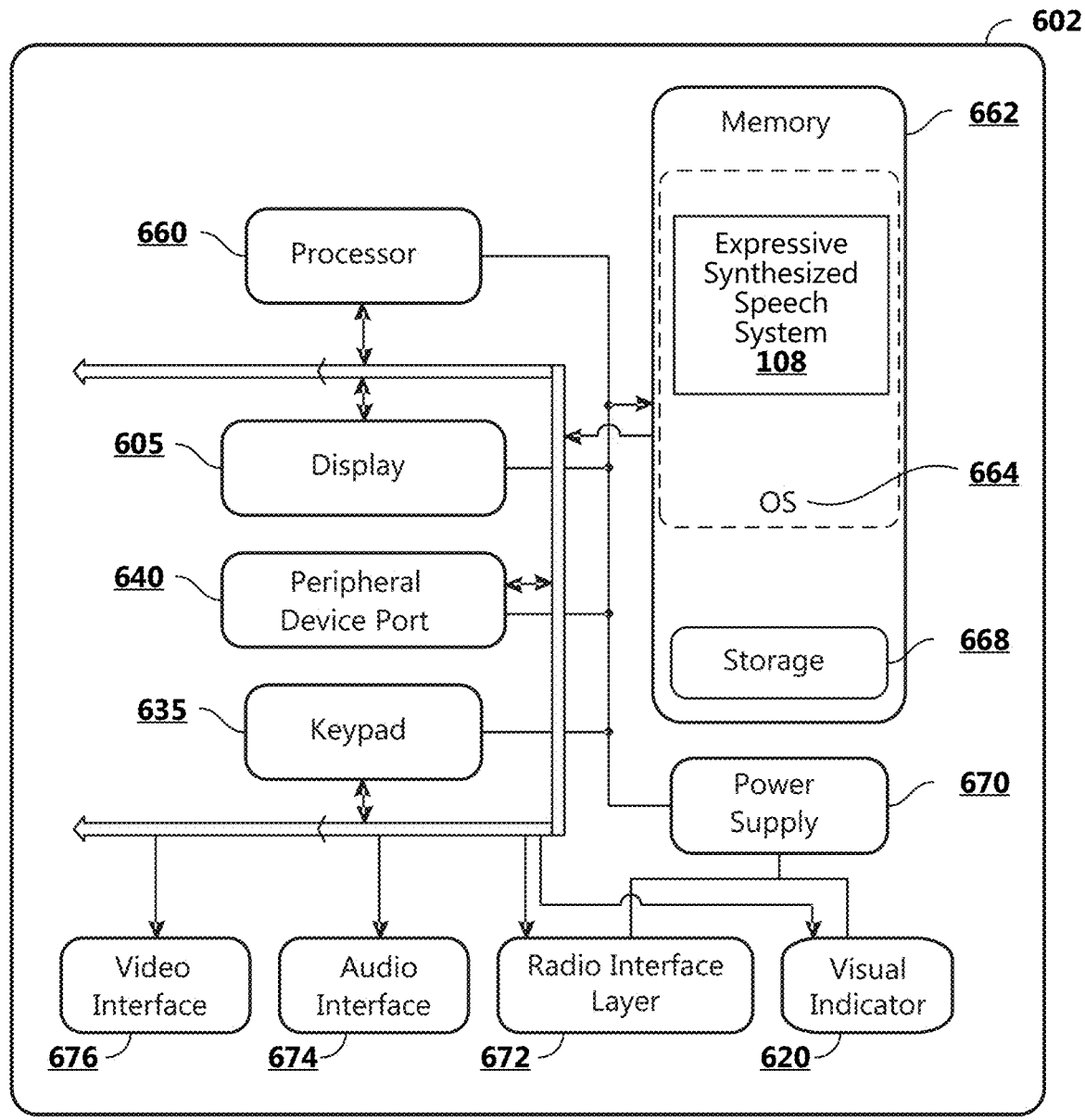
Figure 7:
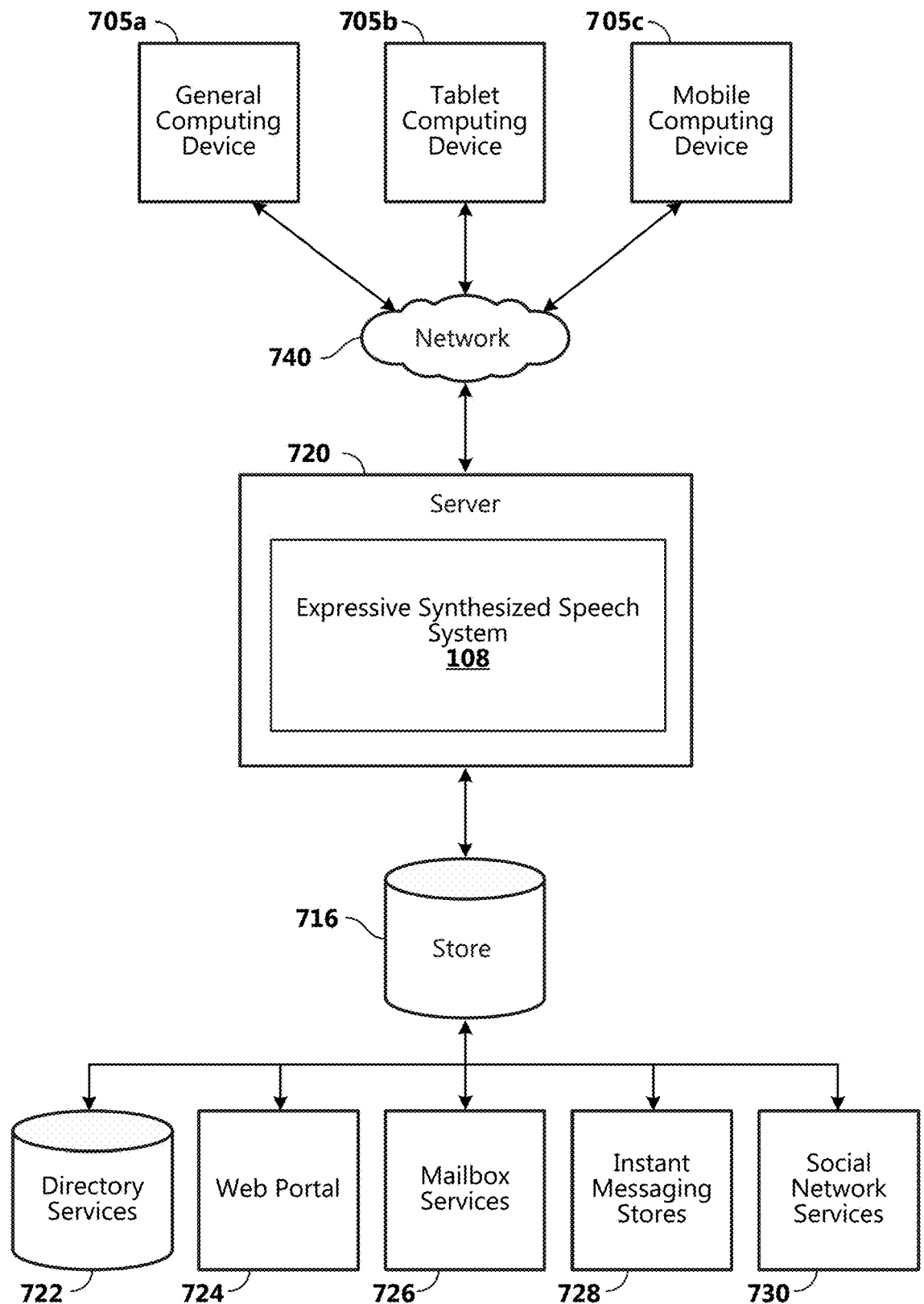
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the expressive synthesized speech system 108. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., expressive synthesized speech system 108) perform processes including, but not limited to, one or more of the stages of the methods 400 and 420 illustrated in FIGS. 4A and 4B. According to an aspect, other program modules are used in accordance with examples and include applications 550 such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the expressive synthesized speech system 108 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for generating expressive content as described above. Content developed, interacted with, or edited in association with the expressive synthesized speech system 108 is enabled to be stored in different communication channels or other storage types. For example, various documents may be stored using a directory service 722, a web portal 724, a mailbox service 726, an instant messaging store 728, or a social networking site 730. The expressive synthesized speech system 108 is operative to use any of these types of systems or the like for generating expressive content, as described herein. According to an aspect, a server 720 provides the expressive synthesized speech system 108 to clients 705a,b,c. As one example, the server 720 is a web server providing the expressive synthesized speech system 108 over the web. The server 720 provides the expressive synthesized speech system 108 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for generating expressive content comprising:
    displaying an expressive keyboard, wherein the expressive keyboard includes an alpha-numeric keyboard for receiving textual input and a plurality of emoji objects for selectively applying a vocal sound effect associated with each of the plurality of emoji objects to received textual input;
    receiving textual input;
    displaying on the expressive keyboard a set of the plurality of emoji objects, based on linguistic properties of the received textual input;
    selecting, by a user, at least one of the displayed emoji objects;
    in response to receiving the selection of the at least one emoji object, identifying a predefined vocal sound effect associated with the selected emoji object;
    combining the identified vocal sound effect with the received textual input;
    outputting the combined identified vocal sound effect and received textual input to a speech generation engine for generating expressive synthesized speech;
    providing a voicesetting editor interface;
    in response to receiving a selection to launch the voicesetting editor interface:
        parsing the received textual input and any selected emoji objects; and
        displaying the parsed textual input and any selected emoji objects as selectable tokens;
    in response to receiving a selection of a token, displaying a set of prosodic properties that can be applied to the selected token; and
    in response to receiving a selection of a prosodic property, displaying a value associated with the selected prosodic property for allowing a user to adjust the value for controlling expressivity of the textual input when rendered.

2. The method of claim 1, wherein displaying the expressive keyboard comprises displaying a plurality of punctuation objects, wherein each punctuation object is illustrative of an emotion.

3. The method of claim 1, further comprising displaying a plurality of emoji objects for providing for display a visual effect associated with a selected emoji object.

4. The method of claim 1, wherein in response to a selection of an emoji object:
    identifying a visual effect associated with the selected emoji object; and
    outputting the visual effect to a visualization generation engine for generating an expressive display of the visual effect.

5. The method of claim 1, wherein displaying the plurality of emoji objects comprises:
    determining a set of emoji objects to display based on data associated with a user's emotional state, wherein the set includes emoji objects associated with an emotion corresponding to the user's emotional state; and
    displaying the set of determined emoji objects.

6. The method of claim 1, wherein combining the identified vocal sound effect with the received textual input comprises applying at least one of pause length, pitch, speed, and emphasis properties to the received textual input.

7. The method of claim 1, wherein combining the vocal sound effect with the received textual input comprises combining a vocal sound effect selected from a group comprised of:
    a laugh;
    a sarcastic scoff;
    a sharp breath in;
    a disgusted "ugh" sound;
    an angry "argh" sound; and
    one or more user-provided sound effects.

8. The method of claim 1, wherein displaying the expressive keyboard comprises displaying a plurality of punctuation objects.

9. The method of claim 1, wherein receiving textual input comprises receiving an upload of an existing text file.

10. The method of claim 1, further comprising:
    providing an active listening mode; and
    in response to receiving a selection to launch the active listening mode, displaying a plurality of selectable active listening mode effect options, wherein each active listening mode effect option has an associated vocal sound effect;
    in response to receiving a selection of an active listening mode effect option:
        identifying the associated vocal sound effect; and outputting the associated vocal sound effect to a speech generation engine for playing the associated vocal sound effect on a conversation partner's audio output device.

11. The method of claim 10, wherein:

displaying the plurality of selectable active listening mode effect options comprises displaying a plurality of selectable active listening mode effect options wherein each active listening mode effect option has an associated visual effect; and in response to receiving a selection of an active listening mode effect option:

identifying the associated visual effect; and outputting the associated visual effect to a visualization generation engine for rendering the associated visual effect on a visual output device.

12. A system for generating expressive content, the computing device comprising:

at least one processing device; and at least one computer readable data storage device storing instructions that, when executed by the at least one processing device, cause the computing device to provide an expressive synthesized speech system, the expressive synthesized speech system operative to:

display an expressive keyboard, wherein the expressive keyboard includes an alpha-numeric keyboard for receiving textual input and a plurality of emoji objects for selectively applying a vocal sound effect associated with each of the plurality of emoji objects to received textual input;

receive textual input;

display on the expressive keyboard a set of the plurality of emoji objects, based on linguistic properties of the received textual input;

select, by a user, at least one of the displayed emoji objects;

in response to receiving the selection of the at least one emoji object, identify a predefined vocal sound effect associated with the selected emoji object;

combine the identified vocal sound effect with the received textual input;

output the combined set of identified vocal sound effect and received textual input to a speech generation engine for generating expressive synthesized speech;

providing a voicesetting editor interface;

in response to receiving a selection to launch the voicesetting editor interface:

parsing the received textual input and any selected emoji objects; and displaying the parsed textual input and any selected emoji objects as selectable tokens;

in response to receiving a selection of a token, displaying a set of prosodic properties that can be applied to the selected token; and in response to receiving a selection of a prosodic property, displaying a value associated with the selected prosodic property for allowing a user to adjust the value for controlling expressivity of the textual input when rendered.

13. The system of claim 12, wherein:

one or more of the plurality of emoji objects has an associated visual effect; and in response to a selection of an emoji object, the expressive synthesized speech system is further operative to:

identify a visual effect associated with the selected emoji object; and output the visual effect to a visualization generation engine for generating an expressive display of the visual effect.

14. The system of claim 12, wherein in combining the identified vocal sound effect with the received textual input, the expressive synthesized speech system is operative to apply at least one of pause length, pitch, speed, and emphasis properties to the received textual input.

15. The system of claim 12, wherein the expressive synthesized speech system is further operative to:

provide an active listening mode; and in response to receiving a selection to launch the active listening mode, display a plurality of selectable active listening mode effect options, wherein each active listening mode effect option has an associated vocal sound effect or visual effect;

in response to receiving a selection of an active listening mode effect option:

identify the associated vocal sound effect or visual effect; and output the associated vocal sound effect to a speech generation engine for playing the associated vocal sound effect on a conversation partner's audio output device or to a visualization generation engine for generating a display of the associated visual effect on a visual output device.

16. The system of claim 12, wherein receiving textual input comprises receiving an upload of an existing text file.

17. A computer readable storage device including computer readable instructions, which when executed by a processing unit is operative to:

display an expressive keyboard, wherein the expressive keyboard includes an alpha-numeric keyboard for receiving textual input and a plurality of emoji objects for selectively applying a vocal sound effect associated with each of the plurality of emoji objects to received textual input;

receive textual input;

display on the expressive keyboard a set of the plurality of emoji objects, based on linguistic properties of the received textual input;

select, by a user, at least one of the displayed plurality of emoji objects;

in response to receiving the selection of the at least one emoji object, identify a predefined vocal sound effect associated with the selected emoji object;

combine the identified vocal sound effect with the received textual input;

output the combined set of identified vocal sound effect and received textual input to a speech generation engine for generating expressive synthesized speech;

providing a voicesetting editor interface;

in response to receiving a selection to launch the voicesetting editor interface:

parsing the received textual input and any selected emoji objects; and displaying the parsed textual input and any selected emoji objects as selectable tokens;

in response to receiving a selection of a token, displaying a set of prosodic properties that can be applied to the selected token; and in response to receiving a selection of a prosodic property, displaying a value associated with the selected prosodic property for allowing a user to adjust the value for controlling expressivity of the textual input when rendered.

18. The computer readable storage device of claim 17, wherein the device is further operative to:
provide an active listening mode; and
in response to receiving a selection to launch the active listening mode, display a plurality of selectable active listening mode effect options, wherein each active listening mode effect option has an associated vocal sound effect or visual effect;
in response to receiving a selection of an active listening mode effect option:
identify the associated vocal sound effect or visual effect; and
output the associated vocal sound effect to a speech generation engine for playing the associated vocal sound effect on a conversation partner's audio output device or to a visualization generation engine for generating a display of the associated visual effect on the conversation partner's visual output device.

19. The computer readable storage device of claim 17, wherein receiving textual input comprises receiving an upload of an existing text file.

\* \* \* \* \*